United States Patent [19]
Suzuki et al.

[11] Patent Number: 5,851,662
[45] Date of Patent: Dec. 22, 1998

[54] ADHESIVE SHEET

[75] Inventors: Kenji Suzuki; Akira Kunihiro; Hiroyuki Ohhashi, all of Utsunomiya, Japan

[73] Assignee: New Oji Paper Co., Ltd., Tokyo, Japan

[21] Appl. No.: 693,193

[22] PCT Filed: Dec. 15, 1995

[86] PCT No.: PCT/JP95/02573

§ 371 Date: Aug. 12, 1996

§ 102(e) Date: Aug. 12, 1996

[87] PCT Pub. No.: WO96/18703

PCT Pub. Date: Jun. 20, 1996

[30] Foreign Application Priority Data

Dec. 16, 1994 [JP] Japan ................................. 6-313794
Nov. 8, 1995 [JP] Japan ................................. 7-289927

[51] Int. Cl.$^6$ ........................................................ B32B 7/12
[52] U.S. Cl. ........................ 428/352; 428/343; 428/349; 428/353; 428/354; 428/355; 428/350
[58] Field of Search ..................... 428/343–356

[56] References Cited

U.S. PATENT DOCUMENTS 5,514,435  5/1996  Suzuki et al. ........................ 428/40

FOREIGN PATENT DOCUMENTS 0 414 353 A2  2/1991  European Pat. Off. .

*Primary Examiner*—Ana Woodward
*Attorney, Agent, or Firm*—Kubovcik & Kubocik

[57] ABSTRACT

The invention provides an adhesive sheet comprising a surface stock and an adhesive layer, the adhesive layer containing a copolymer, the copolymer comprising, based on the copolymer;

(a) 5 to 40% by weight of at least one member selected from a carboxylic acid-modified rosin ester monomer and a rosin ester monomer, and if desired, (b) 5 to 40% by weight of a (poly)ethylene glycol (meth) acrylate monomer, (c) 30 to 60% by weight of a (meth)acrylic acid $C_{4-18}$ alkyl ester monomer, and if desired, (d) 20% by weight or less of an ethylenically unsaturated carboxylic acid-containing monomer, and (e) 20% by weight or less of another monomer which is copolymerizable with components (a), (b) and (c) and component (d) to be used when required. When the adhesive containing the copolymer comprising component (d) and a crosslinking agent, the adhesive sheet has removability. These adhesive sheets of the invention can be readily disintegrated without being adversely affected by the adhesive when the adhesive sheets are made into recycled pulp.

23 Claims, No Drawings

ADHESIVE SHEET

FIELD OF THE INVENTION

The present invention relates to an adhesive sheet, particularly to an adhesive sheet which can be recycled, and more particularly to an adhesive sheet having an adhesive layer composed of an adhesive which is so highly redispersible in water that the adhesive sheet can be readily defibered during the pulp recycling without being adversely affected by the adhesive.

The present invention also relates to a removable adhesive sheet which is used, for example, as a price label, a label for process control or an index label for a video cassette or the like. More particularly, this invention relates to a removable adhesive sheet which has a removable adhesive layer formed from such a highly water-redispersible removable adhesive that the adhesive sheet can be easily defibered in the pulp recycling without being adversely affected by the adhesive.

BACKGROUND ART

Adhesive sheets as processed into labels, stickers, emblems, delivery slips or the like are widely employed for commercial use, office use, process control, distribution control, household use or other purposes. These adhesive sheets generally has an adhesive layer interposed between a surface stock and a release liner.

For use, the adhesive layer and the surface stock together constitute said labels, stickers, emblems or delivery slips (these will be hereinafter collectively referred to as "label"). The label is attached to an article after removal from a release liner.

Papers, foils, films and like sheets are mainly used as the surface stock.

On the other hand, as the release liner, a release liner support as coated with a release agent such as a silicon compound or a fluorine-containing compound is used. Examples of the release liner support include, for example, high-density base papers such as glassine paper; laminated papers wherein a film of a resin such as polyethylene is laminated on a sheet of clay coated paper, kraft paper, woodfree paper or the like; and resin-coated base papers wherein a coating layer predominantly composed of a pigment and a water-soluble high-molecular-weight substance such as polyvinyl alcohol or starch is formed on a sheet of kraft paper, woodfree paper or the like. Among them, generally used are release liners wherein a polyethylene-laminated support is coated with a release agent.

As the adhesive, various rubber-based, acrylic-based, vinyl ether-based adhesives of the emulsion, solvent or solventless type or the like are used. Such adhesive sheets are classified into the permanent adhesion type which, after application to articles such as commodities, is kept adhering thereto for permanent use, and the removable type to be removed and discarded after attainment of display purpose depending on the kind of commodities and the like.

Among such adhesive sheets, removable adhesive sheets are used, for example, as price labels which are frequently removed and attached depending on the change in prices, or as labels for process control purposes. When eventually peeled off after achieving the display purpose, the labels should be easily removed without leaving any portion of the adhesive on the articles such as commodities. In other words, such labels are fundamentally required to have good removability which assures freedom from impairing the appearance of articles.

On the other hand, as to the recycling of waste papers, the amount of waste papers including brokes for regeneration as the raw materials for producing pulps in our country has already exceeded 50% of the raw materials used for the production of papers and paperboards. Therefore, the waste papers have occupied the position of main raw materials.

Waste papers which can be repulped include newspapers, corrugated fiberboards, magazines, simili paper, printing papers, cards, tickets, pasteboards (mounting board), heat-sensitive recording papers, pressure-sensitive copying papers, papers for OCR, etc.

Generally, waste papers can be recycled by a process comprising a disintegration step for defiberizing waste papers to give a pulp suspension, coarse and fine screen selection step for separating extraneous matters from the pulp suspension, a deinking step for removing the printing ink, a bleaching step for decoloring the papers, and so on.

However, waxed papers, adhesive sheets and the like are regarded as waste papers which are difficult to recycle, since water-insoluble wax, adhesives, etc. can not be separated from pulp fibers. Particularly, in the case of adhesive sheets, a water-insoluble adhesive is contained in an amount of as large as 5 to 50% by weight based on the total weight of the adhesive sheet, and additionally the adhesive has a high stickiness, and therefore is considered not to be completely separable from the pulp fibers.

When papermaking is carried out using recycled pulp containing substances having an adhesive power, the adhesives plugs up openings of a wire cloth or soils a press roll and a felt during the papermaking step, thereby posing a problem of causing paper break and pronouncedly reducing papermaking efficiency, or posing a problem of adversely affecting paper layer formation or quality of paper, for example, by inducing spots on the surface of the paper.

Furthermore, adhesive sheets are generally used as coupled with a release liner such as one comprising a laminated base paper which is difficult to be disintegrated, and therefore it is more difficult to process adhesive sheets into recycled pulp.

Since adhesive sheets entail such problems, the pulp recycling from waste papers containing adhesive sheets are not desired, and at the moment such waste papers are disposed as industrial wastes.

Recently several cases have been reported wherein for saving of forest resources and conservation of environment, adhesive sheets which have not been recycled as described above are successfully recycled by managing to tackle the problems physically or in terms of equipment. For example, the adhesive is deprived of its adhesive power by adding an inorganic pigment in the disintegration step, followed by a screening treatment, as disclosed in Japanese Unexamined Patent Publication Hei 4-174787. Also the adhesive can be removed by using a screen of finer openings after disintegration as disclosed in Japanese Unexamined Patent Publication Hei 4-163383. However, all of these methods are extraordinary so that the apparatus conventionally used in the production of recycled pulps from waste papers can not be used as they are.

Also proposed is an adhesive sheet of the type prepared using an adhesive which is soluble in water or an alkali aqueous solution. In this case, however, the adhesive is dissolved in water, and therefore it was difficult to completely remove the substances having an adhesive power from the white water in a system for disintegration and papermaking. Consequently, there was a problem that the adhesive components are gradually accumulated in the white water. Additionally, there was a defect that these adhesives are designed to have a low molecular weight, and therefore the quality of adhesive sheets would be significantly deteriorated under the circumstances of high temperature and/or high humidity.

In the field of the removable adhesive sheets of the type described above, a removable adhesive which is highly redispersible in water or an alkali aqueous solution has not yet been proposed.

DISCLOSURE OF THE INVENTION

The present invention intends to provide an adhesive sheet which, for producing recycled pulp from waste papers containing said adhesive sheet, has an adhesive layer composed of an adhesive having a particularly high redispersibility in water, the adhesive sheet being readily disintegrated without being adversely affected by the adhesive, the adhesive sheet enabling the pulp recycling in a conventional repulping step without contaminating an adjusting water during disintegration, and the adhesive sheet being stable in quality and capable of being recycled.

The present invention also intends to provide a removable adhesive sheet which, for producing recycled pulp from waste papers containing said adhesive sheet, has an adhesive layer composed of an adhesive having a particularly high redispersibility in water or an alkali aqueous solution, the removable adhesive sheet being easily disintegrated without being adversely affected by the adhesive, the removable adhesive sheet enabling the pulp recycling in a conventional repulping step without contaminating an adjusting water during disintegration, and the label of the removable adhesive sheet being easily removed from an article without soiling the article.

The present invention provides:

(1) an adhesive sheet comprising a surface stock and an adhesive layer, the adhesive layer being formed by coating the surface stock with an adhesive having redispersibility in water, and drying the adhesive, the adhesive containing a copolymer, the copolymer comprising, based on the copolymer;
  (a) 5 to 40% by weight of at least one member selected from a carboxylic acid-modified rosin ester monomer and a rosin ester monomer,
  (b) 5 to 40% by weight of a (poly)ethylene glycol (meth)acrylate monomer, and
  (c) 30 to 60% by weight of a (meth)acrylic acid alkyl ester monomer having an alkyl group of 4 to 18 carbon atoms.

The present invention further provides:

(2) an adhesive sheet as defined in item (1) above, wherein the copolymer further contains (d) 20% by weight or less of an ethylenically unsaturated carboxylic acid-containing monomer;

(3) an adhesive sheet as defined above in item (1) or (2) above, wherein the component (a) of the copolymer is a carboxylic acid-modified rosin ester monomer;

(4) an adhesive sheet as defined above in item (2) or (3) above, wherein the surface stock is base paper free of calcium or coated paper free of calcium;

(5) an adhesive sheet as defined in any one of items (1) to (3) above, wherein the surface stock is a film composed of a water-soluble high-molecular-weight substance or a lactic acid-based polymer as a main component, the film being dispersible or soluble in water or an alkali aqueous solution;

(6) an adhesive sheet as defined in any one of items (1) to (5) above, wherein the adhesive layer is protected with a release liner which can be defiberized in water or an alkali aqueous solution;

(7) an adhesive sheet as defined above in item (6) above, wherein the release liner comprises a sealing layer formed on clay-coated paper, kraft paper or woodfree paper and a release agent layer, the sealing layer being composed of a pigment and a water-soluble high-molecular-weight substance and/or an acrylic resin, the acrylic resin having a glass transition temperature of 5° C. or lower, and;

(8) an adhesive sheet as defined in item (6) above, wherein the release liner comprises a support composed of a water-soluble high-molecular-weight substance or a lactic acid-based polymer as a main component, and a release agent layer formed on the support;

(9) an adhesive sheet as defined in item (6) above, wherein the release liner comprises a support having a lactic acid-based polymer laminated thereon or impregnated therein and a release agent layer formed thereon; and

(10) an adhesive sheet as defined in item (1) above, wherein the copolymer further contains another monomer as a component (e) which are copolymerizable with components (a), (b) and (c) and component (d) to be optionally used.

The present invention also provides:

(11) a removable adhesive sheet wherein the adhesive layer is composed of a removable adhesive which is redispersible in water or an alkali aqueous solution and which exhibits removability, namely a removable adhesive sheet, wherein said adhesive layer is formed by applying a removable adhesive containing a specific copolymer selected among the above-mentioned copolymers and a crosslinking agent in an amount of 0.1 to 10 parts by weight per 100 parts by weight of said specific copolymer, followed by drying the adhesive.

Said specific copolymer comprises, based on the copolymer,
  (a) 5 to 40% by weight of at least one member selected from a carboxylic acid-modified rosin ester monomer and a rosin ester monomer,
  (b) 5 to 40% by weight of a (poly)ethylene glycol (meth)acrylate monomer,
  (c) 30 to 60% by weight of a (meth)acrylic acid alkyl ester monomer having an alkyl group having 4 to 18 carbon atoms,
  (d) 0.5 to 20% by weight of an ethylenically unsaturated carboxylic acid-containing monomer, and, when required,
  (e) 20% by weight or less of another monomer which is copolymerizable with components (a), (b), (c) and (d).

As defined above in items (1) to (10) above, the present invention provides adhesive sheets which have an adhesive layer composed of an adhesive having high redispersibility in water or an alkali aqueous solution (hereinafter referred to as "water-redispersibility") so that the adhesive sheets are extremely excellent in the production of recycled pulp.

As defined in item (11) above, the present invention also provides a removable adhesive sheet which has an adhesive layer composed of a removable adhesive having especially high water-redispersibility so that the removable adhesive sheet is excellent in the production of recycled pulp.

In order to prepare such an adhesive sheet which can be recycled, the present invention is characterized by using a copolymer having a specific monomer composition as the adhesive.

The adhesive to be used in the present invention, when immersed in water or an alkali aqueous solution and subjected to friction, shear or like external force exerted by stirring, is redispersed therein in the form of particles having a slight adhesive power or in the form of particles having no adhesive power. Herein, the alkali aqueous solution refers to one which is used in the regeneration of paper, such as an aqueous solution of sodium hydroxide in a concentration of about 0.01 to about 1% by weight.

(1) Adhesive layer

As described hereinbefore, the adhesive to be used in the adhesive sheet of the present invention contains a copolymer, the copolymer comprising, based on the copolymer:

(a) 5 to 40% by weight of a carboxylic acid-modified rosin ester monomer and/or a rosin ester monomer, (b) 5 to 40% by weight of a (poly)ethylene glycol (meth) acrylate monomer, and (c) 30 to 60% by weight of a (meth)acrylic acid $C_{4-18}$ alkyl ester monomer.

The removable adhesive to be used in the removable adhesive sheet of the present invention contains a copolymer which comprises, in addition to the above-mentioned components, an ethylenically unsaturated carboxylic acid-containing monomer as component (d) in an amount of 0.5 to 20% by weight based on the copolymer, the removable adhesive further containing a crosslinking agent in an amount of 0.1 to 10 parts by weight per 100 parts by weight of the copolymer.

Component (a)

The carboxylic acid-modified rosin ester monomer to be used as component (a) in the present invention is a compound represented by the formula (1)

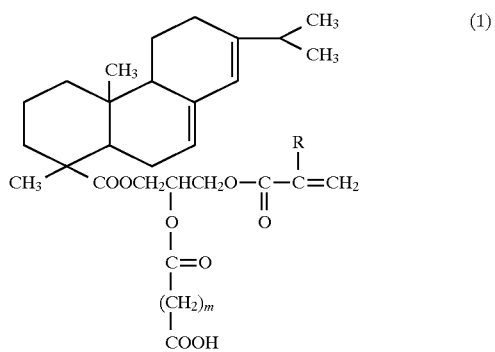

(1)

wherein R is methyl group or a hydrogen atom and m is an integer of 1 to 8.

The rosin ester monomer to be used as component (a) in the present invention is a compound represented by the formula (2)

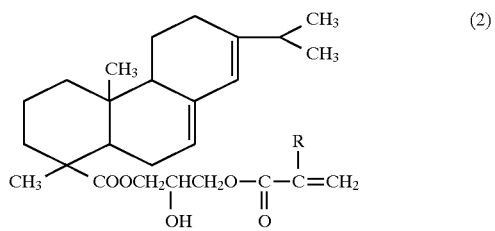

(2)

wherein R is methyl group or a hydrogen atom.

It is necessary to copolymerize the above carboxylic acid-modified rosin ester monomer and/or the rosin ester monomer such that the monomer(s) will account for 5 to 40% by weight, preferably 10 to 30% by weight, of the copolymer. If the amount is less than 5% by weight, insufficient water-redispersibility results. On the other hand, if the amount is more than 40% by weight, the adhesive will have reduced cohesion, impairing the function of the adhesive sheet.

The copolymer prepared using said carboxylic acid-modified rosin ester monomer among the two monomers is especially excellent in water-redispersibility, and hence preferred.

Component (b)

In the present invention, the (poly)ethylene glycol (meth) acrylate monomer to be used as component (b) is, for example, a compound represented by the following formula (3)

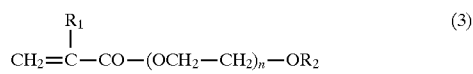

(3)

wherein $R_1$ is methyl group or a hydrogen atom, $R_2$ is methyl group, phenyl group, acryloyl group or methacryloyl group, and n is an integer of 1 to 10.

The foregoing (poly)ethylene glycol (meth)acrylate monomer is a known and readily available compound, and needs to be copolymerized so that the monomer will account for 5 to 40% by weight, preferably 7 to 30% by weight, of the copolymer. The amount of less than 5% by weight results in insufficient water-redispersibility, whereas the amount of more than 40% by weight reduces the cohesion of the adhesive, impairing the function of the adhesive sheet.

Component (c)

Examples of the (meth)acrylic acid alkyl ester monomer having an alkyl group of 4 to 18 carbon atoms, i.e., (meth) acrylic acid $C_{4-18}$ alkyl ester, are butyl (meth)acrylate, hexyl (meth)acrylate, octyl (meth)acrylate, 2-ethyhexyl (meth) acrylate, stearyl (meth)acrylate, etc.

It is necessary to copolymerize said monomer so that the monomer accounts for 30 to 60% by weight, preferably 40 to 60% by weight, of the copolymer. The amount of less than 30% by weight gives poor adhesive power to the adhesive, whereas the amount of more than 60% by weight leads to insufficient water-redispersibility.

The roles which the above-mentioned monomers play for the adhesive are briefly described below. As the component for imparting water-redispersibility to the adhesive, (a) the carboxylic acid-modified rosin ester monomer and/or the rosin ester monomer, and (b) the (poly)ethylene glycol (meth)acrylate monomer are important. As the component for imparting adhesive properties to the adhesive, (c) the (meth)acrylic acid alkyl ester monomer having an alkyl group of 4 to 18 carbon atoms, and (a) the carboxylic acid-modified rosin ester monomer and/or the rosin ester monomer are important. When monomers (a), (b) and (c) as the essential components are used in a well-balanced manner, the resulting copolymer will become an adhesive having water-redispersibility.

Component (d)

The foregoing copolymer, when required, may contain (d) an ethylenically unsaturated carboxylic acid-containing monomer as a component for imparting cohesion to the adhesive and improving the water-redispersibility.

The use of this monomer in excess results in insufficient adhesive power and is likely to degrade the properties of the adhesive with time. Thus, the monomer accounts for up to 20% by weight, preferably about 0.1 to about 10% by weight, of the copolymer.

In the case of the removable adhesive sheet according to the invention, this component (d) is used as the essential component so that said component will account for 0.5 to 20% by weight of the copolymer.

Examples of the ethylenically unsaturated carboxylic acid-containing monomer as component (d) are acrylic acid, methacrylic acid, crotonic acid, maleic acid, fumaric acid, maleic acid monoalkyl (e.g. having 1 to 4 carbon atoms) ester, itaconic acid monoalkyl (e.g. having 1 to 4 carbon atoms) ester, fumaric acid monoalkyl (e.g. having 1 to 4 carbon atoms) ester, etc.

Component (e)

When required, for further regulating the properties of the adhesive, the foregoing copolymer may further contain, as component (e), a monomer which is copolymerizable with components (a), (b) and (c) and optionally used component (d).

Examples of component (e) are methyl (meth)acrylate, ethyl (meth)acrylate, propyl (meth)acrylate, cyclohexyl (meth)acrylate, methoxyethyl (meth)acrylate, ethoxyethyl (meth)acrylate, dimethylaminoethyl (meth)acrylate, diethylaminoethyl (meth)acrylate, glycidyl (meth)acrylate, vinyl acetate, vinyl propionate, vinyl chloride, vinylidene chloride, styrene, divinylbenzene, ethylene, (meth) acrylonitrile, (meth)acrylamide, N-butoxymethyl (meth) acrylamide, N,N'-methylenebis(meth)acrylamide, etc. The proportion of the copolymerizable monomer(s) is up to 20% by weight, preferably 1 to 10% by weight, of the copolymer.

Among these copolymerizable monomers (e), preferable are methyl (meth)acrylate, dimethylaminoethyl (meth) acrylate, glycidyl (meth)acrylate, vinyl acetate, divinylbenzene, (meth)acrylonitrile, (meth)acrylamide, N-methoxymethyl (meth)acrylamide, N-butoxymethyl (meth)acrylamide, N,N'-methylenebis(meth)acrylamide, etc., because the use of such monomer contributes to the production of a copolymer which has a suitable crosslinkability, glass transition temperature, adhesive power and so on.

Consequently, in order to obtain an adhesive having excellent water-redispersibility and good adhesive properties for use in the invention, it is very important to balance the proportions of (a) the carboxylic acid-modified rosin ester monomer and/or the rosin ester monomer, (b) the (poly)ethylene glycol (meth)acrylate monomer, (c) the (meth)acrylic acid alkyl ester monomer having an alkyl group of 4 to 18 carbon atoms, and further to balance the proportions of (d) the ethylenically unsaturated carboxylic acid-containing monomer, and (e) another monomer copolymerizable with these monomers.

The process for preparing the foregoing copolymer is not specifically limited. The copolymer can be prepared by conventional processes, for example, by carrying out a solution polymerization in the presence of water, a solvent, a chain transfer agent, a polymerization initiator and the like, or by carrying out an emulsion polymerization in an aqueous system in the presence of an emulsifier, a chain transfer agent, a polymerization initiator, a dispersing agent and the like.

Basically, the polymerization is performed using a monomer mixture of said components in the above-mentioned proportions, namely, a monomer mixture containing, based on the monomer mixture, 5 to 40% by weight of component (a), 5 to 40% by weight of component (b), 30 to 60% by weight of component (c) and when required, up to 20% by weight of component (d) and up to 20% by weight of component (e).

Examples of the polymerization initiator to be used in the polymerization are persulfates such as potassium persulfate, ammonium persulfate, etc.; azo compounds such as 2,2'-azobisisobutyronitrile, 2,2'-azobis(2,4-dimethylvaleronitrile), etc.; peroxides such as hydrogen peroxide, benzoyl peroxide, lauryl peroxide, etc.; and so-called redox-type initiators such as a combination of ammonium persulfate and sodium sulfite, acidic sodium sulfite or the like. The amount of the polymerization initiator to be used is usually about 0.2 to about 2% by weight, preferably about 0.3 to about 1% by weight, based on the total amount of the monomers to be used for the polymerization.

Examples of chain transfer agents to be added in the copolymerization are alkyl mercaptans such as octyl mercaptan, nonyl mercaptan, decyl mercaptan, dodecyl mercaptan, etc.; thioglycolic acid esters such as octyl thioglycolate, nonyl thioglycolate, 2-ethylhexyl thioglycolate, 2-ethylhexyl β-mercaptopropionate, etc.; 2,4-diphenyl-4-methyl-1-pentene, 1-methyl-4-isopropylidene-1-cyclohexene, etc. Among them, preferable are thioglycolic acid esters, 2,4-diphenyl-4-methyl-1-pentene or 1-methyl-4-isopropylidene-1-cyclohexene, because the use thereof reduces the odor of the obtained copolymer. The amount of the chain transfer agent to be used is adjusted to about 0.001 to about 3% by weight based on the total amount of the monomers to be polymerized.

A suitable concentration of the monomers at the time of the polymerization is 30 to 70% by weight, preferably 40 to 60% by weight. The polymerization reaction is carried out at 60° to 100° C. over a period of 2 to 8 hours. If necessary, a thickener, wetting agent, leveling agent, defoaming agent, antiseptic agent, etc. can be suitably added.

It is preferable that the carboxyl group of the copolymer prepared by the foregoing process is neutralized with a suitable alkaline substance such as sodium hydroxide, potassium hydroxide, ammonia, primary, secondary or tertiary amines or the like. By carrying out the neutralization treatment, the mechanical stability can be improved and the viscosity can be adjusted. In view of the drying step after the coating operation, it is preferable to use ammonia which is vaporizable by the heat applied during the drying step. The conditions for the neutralization treatment are not specifically limited. For example, an aqueous emulsion of the copolymer is admixed with said alkali substance as it is or in the form of an aqueous solution in an amount effective for neutralizing the copolymer at a temperature of about 20° to about 40° C., followed by stirring.

The glass transition temperature of the copolymer is in the range of −60° to −20° C., and is suitably selected according to the intended purpose. If the glass transition temperature of the copolymer is lower than −60° C., the resulting film would be insufficient in cohesion. On the other hand, if the glass transition temperature is higher than −20° C., the coating film of the copolymer would be too hard and would be likely to become unsuitable for use.

According to the invention, an adhesive sheet which can be recycled is produced by using such a copolymer as the adhesive.

It is preferable that the copolymer is usually in the form of an aqueous emulsion obtained by emulsion polymerization. The solid concentration of the emulsion is not specifically limited, but is preferably about 30 to about 70% by weight, in view of coating efficiency.

Removable adhesive

According to the present invention, said copolymer, preferably said copolymer in the form of an aqueous emulsion obtained by emulsion polymerization, as described above can also be used in the preparation of a removable adhesive. That is to say, according to the invention, an adhesive which shows removability without sacrificing the water-redispersibility can be prepared by using a specific copolymer among said copolymers and a crosslinking agent.

The foregoing specific copolymer comprises, based on the copolymer, (a) 5 to 40% by weight (preferably 10 to 30% by weight) of at least one member selected from a carboxylic acid-modified rosin ester monomer and a rosin ester monomer, (b) 5 to 40% by weight (preferably 7 to 30% by weight) of a (poly)ethylene glycol (meth)acrylate monomer, (c) 30 to 60% by weight (preferably 40 to 60% by weight) of a (meth)acrylic acid alkyl ester monomer having an alkyl group of 4 to 18 carbon atoms, (d) 0.5 to 20% by weight (preferably 1 to 10% by weight) of an ethylenically unsaturated carboxylic acid-containing monomer, and, when required, (e) 20% by weight or less (preferably 1 to 10% by weight) of another monomer copolymerizable with the components (a), (b), (c) and (d).

Examples of the crosslinking agent for imparting removability are polyglycidyl compounds having at least 2, preferably 2 to 4, epoxy groups per molecule, such as ethylene glycol diglycidyl ether, poly(e.g., polymerization degree=2 to 30)ethylene glycol diglycidyl ethers, propylene glycol diglycidyl ether, poly(e.g., polymerization degree=2 to 30)propylene glycol glycidyl ethers, neopentyl glycol diglycidyl ether, 1,6-hexanediol diglycidyl ether, dibromoneopentyl glycol diglycidyl ether, o-phthalic acid diglycidyl ester, trimethylol propane poly(e.g., di- or tri-)glycidyl ethers, diglycerol poly(e.g., di- to tetra-)glycidyl ethers, glycerol poly(e.g. di- or tri-)glycidyl ethers, pentaerythritol poly(e.g., di- to tetra-)glycidyl ethers, sorbitol poly(e.g., di- to hexa-)glycidyl ethers and the like; polyisocyanate compounds having at least 2, preferably 2 to 4, isocyanate groups per molecule, such as 1,2-ethylene diisocyanate, 1,4-tetramethylene diisocyanate, 1,6-hexamethylene diisocyanate, 2,2,4-trimethyl-1,6-hexamethylene diisocyanate, 2,2,4-trimethyl-1,6-hexamethylene diisocyanate, 1,12-dodecane diisocyanate, cyclobutane-1,3-diisocyanate, cyclohexane-1,4-diisocyanate, dicyclohexyl-2,4'-diisocyanate, dicyclohexyl-4,4'-diisocyanate, xylene diisocyanate and the like; isocyanate generators which are adducts of said isocyanate compound with an active hydrogen-containing compound such as prussic acid, a malonic acid diester, acetylacetone, 1-phenyl-3-methyl-5-pyrazolone, hydroxylamine, an aryl mercaptan, a caprolactam, pyrocatechol, an aliphatic mercaptan, monomethylaniline, diphenylamine, phenol and the like. These crosslinking agents can be used either alone or in mixture.

Of the above crosslinking agents, particularly used from the standpoint of reactivity are diglycerol poly(e.g., di-, tri- or tetra-)glycidyl ethers, glycerol poly(e.g., di- or tri-) glycidyl ethers, trimethylol propane poly(e.g., di- or tri-) glycidyl ethers and pentaerythritol poly(e.g., di- to tetra-) glycidyl ethers.

The amount of the crosslinking agent to be used is adjusted in the range of 0.1 to 10 parts by weight, preferably 1 to 5 parts by weight, per 100 parts by weight of the copolymer. If the amount is less than 0.1 part by weight, the obtained adhesive would show too high adhesion to an article with the result that when the label attached to an article is removed from the article, the adhesive would be separated from the surface stock and remain on the surface of the article (hereinafter referred to as "adhesive transfer") or the surface stock would fracture, thereby exhibiting low removability. On the other hand, the use of more than 10 parts by weight results in too high crosslinking density and thus in too low adhesion of the adhesive, hence practically improper for use.

The methods of mixing the crosslinking agent with the above copolymer are not specifically limited, and include, for example, batchwise mixing methods using a homomixer or like blenders, and methods wherein the components are continuously mixed in specific amounts within a pump such as a mono-pump, snake pump or the like.

The roles which the monomers and the crosslinking agent play for the removable adhesive of the invention are briefly described below. As the component for imparting water-redispersibility to the adhesive, important are both of (a) the carboxylic acid-modified rosin ester monomer and/or the rosin ester monomer, and (b) the polyethylene glycol (meth) acrylate monomer. As the component for imparting adhesion to the adhesive, important are (c) the (meth)acrylic acid $C_{4-18}$ alkyl ester monomer and (a) the carboxylic acid-modified rosin ester monomer and/or the rosin ester monomer. As the component for imparting cohesion to the adhesive, important is (d) the ethylenically unsaturated carboxylic acid-containing monomer. For the purpose of giving removability to the adhesive, it is important to add an epoxy compound or an isocyanate compound or the like as a crosslinking agent to thereby effect a crosslinking reaction with a carboxylic acid group.

Accordingly, for preparing an adhesive which is excellent in water-redispersibility and in removability as the adhesive of the invention, it is important to balance the proportions of (a) the carboxylic acid-modified rosin ester monomer and/or a rosin ester monomer, (b) the (poly)ethylene glycol (meth) acrylate monomer, (c) the (meth)acrylic acid $C_{4-18}$ alkyl ester monomer, (d) the ethylenically unsaturated carboxylic acid-containing monomer, and optionally used (e) another monomer which is copolymerizable with these monomers. And it is also important to add the epoxy compound or the isocyanate compound or the like as a crosslinking agent for crosslinking reaction.

When the removable adhesive sheet of the invention is prepared and aged, the crosslinking agent causes a crosslinking reaction to bring the adhesive sheet into a stable state free of change in properties of the adhesive, whereby the adhesive sheet exhibits excellent removability. The conditions for aging the adhesive sheet can be conventional, and may for example take about 2 weeks at room temperature, or about one week at 40° C.

(2) Surface stock

As the surface stock which constitutes the adhesive sheet, supports such as films (such as cellophane, polyethylene, polypropylene, flexible polyvinyl chloride, rigid polyvinyl chloride, polyesters, etc.); papers (such as woodfree paper, art paper, coated paper, cast-coated paper, foil paper, kraft paper, impregnated paper, vapor-deposited paper, low-sized paper, water-soluble paper, etc.); metal foils, synthetic paper, nonwoven fabrics and like supports are used; and additionally various coated sheets prepared by providing on these supports one or more coating layers such as a heat-sensitive recording layer, a layer for receiving thermal transfer images, an ink-receiving layers, a variety of printed layers, colored layers, hiding layers, etc.

In view of the suitability of the adhesive sheet for recycling, it is desirable to use, as the surface stock, above-mentioned paper, a water-soluble film formed from a water-soluble polymer such as polyvinyl alcohol, carboxymethyl cellulose, methyl cellulose or the like, or alternatively a film which is readily hydrolyzable with an alkali aqueous solution and which is formed from a lactic acid-based polymer such as a copolymer of lactic acid or lactide and a hydroxycarboxylic acid such as glycolic acid, hydroxybutyric acid, hydroxyvaleric acid, hydroxypentanoic acid, hydroxycaproic acid, hydroxyheptanoic acid or the like, or polylactic acid.

Of the above-mentioned papers and the like, those which contain calcium in the base paper or in the coating layer have been found to decrease the adhesive properties of the adhesive sheet with time or during storage under high humidity conditions, and therefore it is preferable to prepare them so that they will not contain calcium.

For example, when a paper such as art paper, coated paper, cast-coated paper or the like having a pigment coating layer predominantly containing a pigment and a binder on the front surface of the base paper thereof, or a paper having a sealing layer (a layer for preventing the adhesive from penetrating into the base paper) predominantly containing a pigment and a binder on the rear side of the base paper thereof is used as the surface stock, an adhesive sheet having a stable adhesive properties can be prepared by selectively using a calcium-free pigment such as inorganic pigments such as kaolin, clay, talc, calcined kaolin, titanium dioxide, aluminum hydroxide, silica, white carbon and the like, or organic synthetic pigments such as fine particles of polystyrene resin, fine particles of urea-formalin resin, microballoons and the like.

The reason therefor has not yet been completely clarified, but may presumably be as follows: when a mineral pigment containing calcium, such as ground calcium carbonate, precipitated calcium carbonate or satin white is used, the calcium of said mineral pigment is made into calcium ions and is migrated to a highly acidic adhesive layer containing a large amount of carboxylic acid, whereby a metal crosslinking reaction is caused between the calcium ions and the carboxylic acid, thereby reducing the adhesive properties. If calcium is present in the surface stock, the decrease in adhesive properties can be alleviated by incorporating into any of the layers of the surface stock or into the adhesive layer a sequestering agent, examples of which are a dibasic acid such as phthalic acid, succinic acid, oxalic acid, aspartic acid or the like, ethylenediaminetetramine, a condensed phosphate such as sodium tripolyphosphate, acidic sodium metaphosphate, potassium pyrophosphate, sodium hexametaphosphate, sodium polyphosphate, potassium polyphosphate, potassium metaphosphate or the like.

In forming the above-mentioned pigment coating layer or the sealing layer, a binder is used in addition to a pigment in order to affix the pigment particles to each other and in order to bond the pigment to the surface of the base paper. Examples of the binder to be used in the pigment coating layer or the sealing layer include various conventional materials such as casein, starch, carboxymethyl cellulose, methyl cellulose, polyvinyl alcohol, styrene-butadiene copolymer, methyl methacrylate-butadiene copolymer, ethylene-vinyl chloride copolymer, ethylene-vinyl acetate copolymer, acrylic acid ester copolymer, etc.

The pigment and the binder are dispersed in water to give a pigment coating composition. While the proportions of the pigment and the binder can be suitably selected from a wide range, generally it is recommendable to use, based on the combined amount of the pigment and the binder, about 70 to about 95% by weight, preferably about 80 to about 90% by weight, of the pigment and about 5 to about 30% by weight, preferably about 10 to about 20% by weight, of the binder.

The solids content by weight in the pigment coating composition is suitably selected depending on the coating method, but generally a preferred solid content is about 40 to about 70% by weight.

If desired, the pigment coating composition comprising the pigment and the binder may contain one or more auxiliary agents such as a defoaming agent, a dispersing agent, a dye and the like as far as they do not impair the properties of the pigment coating composition. The pigment coating composition can be applied using a usual coater such as blade coater, bar coater, air knife coater, gravure coater or the like. The amount of the pigment coating composition to be applied for forming the pigment coating layer is at least 2 g/m$^2$, preferably about 5 to about 30 g/m$^2$, on dry weight basis. The amount of the coating composition to be applied for forming the sealing layer is at least 0.1 g/m$^2$, preferably about 1 to about 10 g/m$^2$, on dry weight basis.

(3) Release liner

The release liner can be a known one and includes, for example, release liners composed of a release liner support and a release agent layer which is formed by applying to said release liner support an emulsion type, solvent type or solventless type release agent comprising a silicone resin, fluorine-containing resin or the like in an amount of about 0.05 to about 3 g/m$^2$ on dry weight basis, followed by heat curing, electron radiation curing or the like.

The release agent can be any of those conventionally used in the field of adhesive sheets.

Examples of the release liner support include high-density base papers such as glassine paper; clay-coated papers; clay-coated paper, kraft paper, woodfree paper or the like, each having a sealing layer predominantly composed of a pigment and a natural or synthetic resin such as casein, dextrin, starch, carboxymethyl cellulose, methyl cellulose, ethyl cellulose, hydroxyethyl cellulose, polyvinyl alcohol, styrene-butadiene copolymer, methyl methacrylate-butadiene copolymer, ethylene-vinyl chloride copolymer, ethylene-vinyl acetate copolymer, acrylic acid ester copolymer or the like; polyethylene-laminated paper prepared by laminating a film of polyethylene or the like on a sheet of kraft paper, woodfree paper or the like; and films of polyethylene terephthalate or the like.

The sealing layer is formed between the release liner support and the release agent layer. Useful pigments for forming the sealing layer include those exemplified above in connection with the sealing layer of the surface stock.

If a calcium-containing pigment such as calcium carbonate is used, the adhesive properties would be lowered. Therefore, it is desirable to use a calcium-free pigment or to incorporate a metal sequestering agent into the sealing layer.

The proportions of the pigment and the natural or synthetic resin to be used can be suitably selected from a wide range. Generally, it is recommendable to use, based on the combined amount of the pigment and the natural or synthetic resin, about 5 to about 30% by weight, preferably about 10 to about 20% by weight, of the pigment and about 70 to about 95% by weight, preferably about 80 to about 90% by weight, of said resin.

The sealing layer is formed by applying a coating composition for forming the sealing layer to a release liner support, followed by drying, the coating composition being prepared by dispersing the above resin and the above pigment in water. The solids content by weight of the coating composition for forming the sealing layer is suitably selected according to the coating method, but is preferably about 30 to about 70% by weight.

The amount of the coating composition for forming the sealing layer to be applied is selected from a wide range but is generally about 1 to about 20 g/m$^2$, on dry weight basis.

Also usable are release liners prepared by forming a release agent layer on a support which is formed by laminating on, or impregnating into, kraft paper, woodfree paper or the like a lactic acid-based polymer, such as a copolymer of lactic acid or lactide and a hydroxycarboxylic acid, e.g., glycolic acid, hydroxybutyric acid, hydroxyvaleric acid, hydroxypentanoic acid, hydroxycaproic acid or hydroxyheptanoic acid, polylactic acid or the like; or release liners prepared by forming a release agent layer on a film of a lactic acid-based polymer per se. Said copolymers and polylactic acids are known as hydrolyzable polymers or bioabsorbable polymers, and are disclosed, e.g., in Japanese Unexamined Patent Publication (Kokai) Hei 6-191550.

In this case, if, for example, a film of said lactic acid-based polymer is used, the thickness of the film can be selected from a wide range and is usually about 1 to about 30 μm, preferably about 10 to about 20 μm. The lactic acid-based polymer is laminated on glassine paper or woodfree paper by conventional dry laminating methods or wet laminating methods.

On the other hand, the lactic acid-based polymer can be impregnated into kraft paper, woodfree paper or the like either by dissolving the lactic acid-based polymer in an organic solvent such as tetrahydrofuran or the like to a concentration of about 1 to about 20% by weight, and then immersing the release liner support such as kraft paper or woodfree paper in the obtained solution, or alternatively by coating the kraft paper, woodfree paper or like support with the obtained solution, followed by drying. The impregnation amount is not specifically limited, but is usually about 0.1 to about 10 g/m$^2$, preferably about 1 to about 5 g/m$^2$. It is preferable that the obtained layer is smooth-finished in a supercalender or the like, because such treatment can give a uniform release agent layer.

In view of the recycling suitability of the adhesive sheet including the release liner, it is favorable to use release liners prepared by forming a release agent layer on a release liner support which is prepared by forming a disintegratable sealing layer in an amount of about 0.1 to about 10 g/m$^2$ on dry weight basis on clay coated paper, kraft paper, woodfree paper or the like, the sealing layer comprising a pigment such as kaolin and a water-soluble high-molecular-weight substance, such as polyvinyl alcohol, or an acrylic resins having a glass transition temperature of 5° C. or less, such as acrylic acid ester copolymers comprising butyl acrylate, acrylonitrile, acrylic acid or like monomer component; release liners prepared by forming a release agent layer on a release liner support composed of a water- or an alkali aqueous solution-soluble or dispersible film of a water-soluble high-molecular-weight substance, such as polyvinyl alcohol, carboxymethyl cellulose, methyl cellulose or the like; release liners prepared by forming a release agent layer on a film of a lactic acid-based polymer.

(4) Adhesive sheet

The adhesive sheet is usually prepared by applying an adhesive to the surface of a release agent layer of a release liner, drying the applied adhesive to form an adhesive layer, and affixing a surface stock to the adhesive layer, thereby providing a finished adhesive sheet. An adhesive may be directly applied to a surface stock to provide an adhesive layer.

The coater to be used for applying the adhesive include, for example, roll coaters, knife coaters, bar coaters, dye coaters, comma coaters, lip coaters, gravure coaters and the like. The coating amount of the adhesive is adjusted within a range of about 5 to about 50 g/m$^2$ on dry weight basis. If the amount is less than 5 g/m$^2$, unsatisfactory adhesive properties of the adhesive sheet results, whereas if the amount is more than 50 g/m$^2$, the adhesive may be forced out when the adhesive sheet is laminated to a release liner or cohesive failure may take place in removing the adhesive sheet.

The obtained adhesive sheet of the invention is an adhesive sheet which is excellent in suitability for recycling pulps because the adhesive used is readily redispersible in water, and which is satisfactorily usable from the standpoint of adhesive properties.

Also, the removable adhesive sheet of the invention is an adhesive label or adhesive sheet which is excellent in suitability for recycling pulps because the adhesive used is readily redispersible in water, and which is satisfactorily usable from the standpoint of adhesive properties.

EXAMPLES

The following Examples illustrate the present invention in more detail. They are of course by no means limitative of the scope of the present invention. In the Examples, parts, weight, proportions, coating amounts and the like are all expressed on solid weight basis, unless otherwise specified, and "part(s)" and "%" mean "part(s) by weight" and "% by weight", respectively, unless otherwise specified.

Example I-1

(i) Synthesis of carboxylic acid-modified rosin ester

A flask equipped with a stirrer, an exhaust tube, a dropping funnel, a nitrogen inlet tube and a thermometer was charged with 70 g of methacrylic acid and 90 g of epichlorohydrin, and the charge was heated under nitrogen gas to 100° C. and maintained at the same temperature for 2 hours. Then, 300 g of fully dissolved abietic acid rosin was added, and the mixture was maintained at 230° C. for 2 hours. Subsequently, 125 g of glutaric anhydride was added, and the resulting mixture was maintained at 230° C. for 2 hours to synthesize the carboxylic acid-modified rosin ester represented by the formula (4).

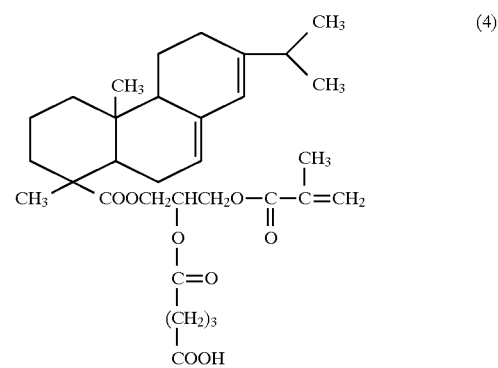

(ii) Production of adhesive

An emulsified monomer mixture was prepared by mixing the following components in the following amounts.

| | |
|---|---|
| Carboxylic acid-modified rosin ester represented by the formula (4) | 60 parts |
| Methoxydiethylene glycol methacrylate | 60 parts |
| Butyl acrylate | 100 parts |
| 2-Ethylhexyl acrylate | 100 parts |
| Acrylic acid | 40 parts |

| | |
|---|---|
| Dimethylaminoethyl methacrylate | 40 parts |
| Anionic emulsifier (tradename "Emul NC-35", product of Kao Corp.) | 6 parts |
| Ion-exchanged water | 150 parts |

Then, a flask equipped with a stirrer, a cooler, a dropping funnel, a nitrogen inlet tube and a thermometer was charged with 150 parts of ion-exchanged water, 3 parts of potassium peroxide and 3 parts of octyl mercaptan, and the charge was heated to 80° C. while replacing the air in the flask with nitrogen. Thereafter, one sixth of the above-obtained emulsified monomer mixture was added dropwise. When the degree of conversion reached 90%, the remaining portion of the emulsified monomer mixture was added dropwise over a period of 3 hours to carry out polymerization. After completion of the dropwise addition, the resulting mixture was aged for 3 hours to complete the reaction.

Subsequently, the contents of the flask were cooled to 40° C., and aqueous ammonia was added so as to adjust the pH value to about 7 to carry out neutralization reaction. After completion of the reaction, the reaction mixture was vigorously stirred, giving an adhesive.

(iii) Production of adhesive sheet

The adhesive obtained above was applied to a commercially available polyethylene-laminated release liner (which consists of polyethylene-laminated paper and a release agent layer formed from a silicone-based release agent, the release agent layer being provided on said paper in an amount of 0.5 g/m² on dry weight basis) in an amount of 25 g/m² on dry weight basis and dried, and the resulting release liner was superposed on commercially available woodfree paper weighing 64 g/m², giving an adhesive sheet.

Example I-2

(i) Production of adhesive

An emulsified monomer mixture was prepared by mixing the following components in the following amounts.

| | |
|---|---|
| Carboxylic acid-modified rosin ester represented by the formula (4) | 60 parts |
| Methoxydiethylene glycol methacrylate | 60 parts |
| Butyl acrylate | 60 parts |
| 2-Ethylhexyl acrylate | 100 parts |
| Acrylic acid | 80 parts |
| Dimethylaminoethyl methacrylate | 40 parts |
| Anionic emulsifier (tradename "Emul NC-35", product of Kao Corp.) | 6 parts |
| Ion-exchanged water | 150 parts |

Then, an adhesive was produced in the same manner as in Example I-1.

(ii) Production of adhesive sheet

An adhesive sheet was produced in the same manner as in Example I-1 with the exception that the adhesive obtained above was used.

Example I-3

(i) Production of adhesive

An emulsified monomer mixture was prepared by mixing the following components in the following amounts.

| | |
|---|---|
| Carboxylic acid-modified rosin ester represented by the formula (4) | 80 parts |
| Methoxydiethylene glycol methacrylate | 20 parts |
| Butyl acrylate | 100 parts |
| 2-Ethylhexyl acrylate | 140 parts |
| Acrylic acid | 20 parts |
| Dimethylaminoethyl methacrylate | 40 parts |
| Anionic emulsifier (tradename "Emul NC-35", product of Kao Corp.) | 6 parts |
| Ion-exchanged water | 150 parts |

Then, an adhesive was produced in the same manner as in Example I-1.

(ii) Production of adhesive sheet

An adhesive sheet was produced in the same manner as in Example I-1 with the exception that the adhesive obtained above was used.

Example I-4

(i) Production of adhesive

An emulsified monomer mixture was prepared by mixing the following components in the following amounts.

| | |
|---|---|
| Carboxylic acid-modified rosin ester represented by the formula (4) | 60 parts |
| Methoxydiethylene glycol methacrylate | 60 parts |
| Butyl acrylate | 100 parts |
| 2-Ethylhexyl acrylate | 120 parts |
| Acrylic acid | 8 parts |
| Dimethylaminoethyl methacrylate | 52 parts |
| Anionic emulsifier (tradename "Emul NC-35", product of Kao Corp.) | 6 parts |
| Ion-exchanged water | 150 parts |

Then, an adhesive was produced in the same manner as in Example I-1.

(ii) Production of adhesive sheet

An adhesive sheet was produced in the same manner as in Example I-1 with the exception that the adhesive obtained above was used.

Example I-5

(i) Production of adhesive

An emulsified monomer mixture was prepared by mixing the following components in the following amounts.

| | |
|---|---|
| Carboxylic acid-modified rosin ester represented by the formula (4) | 160 parts |
| Phenoxydiethylene glycol acrylate | 20 parts |
| Butyl acrylate | 40 parts |
| 2-Ethylhexyl acrylate | 100 parts |
| Acrylic acid | 60 parts |
| Dimethylaminoethyl methacrylate | 20 parts |
| Anionic emulsifier (tradename "Emul NC-35", product of Kao Corp.) | 6 parts |
| Ion-exchanged water | 150 parts |

Then, an adhesive was produced in the same manner as in Example I-1.

(ii) Production of adhesive sheet

An adhesive sheet was produced in the same manner as in Example I-1 with the exception that the adhesive obtained above was used.

Example I-6

(i) Production of adhesive

An emulsified monomer mixture was prepared by mixing the following components in the following amounts.

| | |
|---|---|
| Carboxylic acid-modified rosin ester represented by the formula (4) | 60 parts |
| Phenoxydiethylene glycol acrylate | 60 parts |
| Butyl acrylate | 100 parts |
| 2-Ethylhexyl acrylate | 120 parts |
| Acrylic acid | 20 parts |
| Dimethylaminoethyl methacrylate | 40 parts |
| Anionic emulsifier (tradename "Emul NC-35", product of Kao Corp.) | 6 parts |
| Ion-exchanged water | 150 parts |

Then, an adhesive was produced in the same manner as in Example I-1.

(ii) Production of adhesive sheet

An adhesive sheet was produced in the same manner as in Example I-1 with the exception that the adhesive obtained above was used.

Example I-7

(i) Production of adhesive

An emulsified monomer mixture was prepared by mixing the following components in the following amounts.

| | |
|---|---|
| Carboxylic acid-modified rosin ester represented by the formula (4) | 120 parts |
| Phenoxydiethylene glycol acrylate | 100 parts |
| Butyl acrylate | 40 parts |
| 2-Ethylhexyl acrylate | 90 parts |
| Acrylic acid | 20 parts |
| Dimethylaminoethyl methacrylate | 30 parts |
| Anionic emulsifier (tradename "Emul NC-35", product of Kao Corp.) | 6 parts |
| Ion-exchanged water | 150 parts |

Then, an adhesive was produced in the same manner as in Example I-1.

(ii) Production of adhesive sheet

An adhesive sheet was produced in the same manner as in Example I-1 with the exception that the adhesive obtained above was used.

Example I-8

(i) Production of rosin ester

A flask equipped with a stirrer, an exhaust tube, a dropping funnel, a nitrogen inlet tube and a thermometer was charged with 70 g of methacrylic acid and 90 g of epichlorohydrin, and under nitrogen gas, the charge was heated to 100° C. and maintained at the temperature for 2 hours. Then, 300 g of fully dissolved abietic acid rosin was added, and the mixture was maintained at 230° C. for 2 hours to synthesize the rosin ester represented by the formula (5).

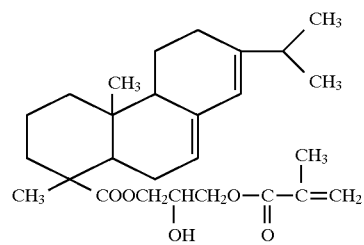

(5)

(ii) Production of adhesive

An emulsified monomer mixture was prepared by mixing the following components in the following amounts.

| | |
|---|---|
| Rosin ester represented by the formula (5) | 60 parts |
| Methoxydiethylene glycol methacrylate | 60 parts |
| Butyl acrylate | 100 parts |
| 2-Ethylhexyl acrylate | 120 parts |
| Acrylic acid | 8 parts |
| Dimethylaminoethyl methacrylate | 52 parts |
| Anionic emulsifier (tradename "Emul NC-35", product of Kao Corp.) | 6 parts |
| Ion-exchanged water | 150 parts |

Then, an adhesive was produced in the same manner as in Example I-1.

(ii) Production of adhesive sheet

An adhesive sheet was produced in the same manner as in Example I-1 with the exception that the adhesive obtained above was used.

Example I-9

(i) Synthesis of carboxylic acid-modified rosin ester

The carboxylic acid-modified rosin ester represented by the formula (6) was synthesized in the same manner as in Example I-1 with the exception that 60 g of acrylic acid and 140 g adipic anhydride were used in lieu of methacrylic acid and glutaric anhydride, respectively.

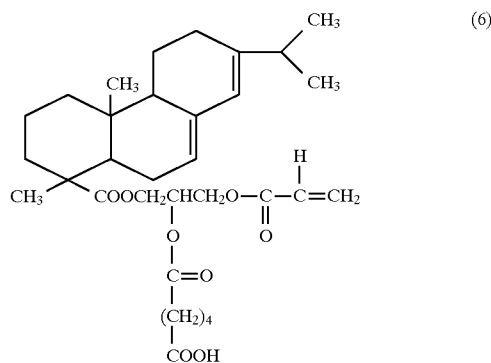

(6)

(ii) Production of adhesive

An emulsified monomer mixture was prepared by mixing the following components in the following amounts.

| | |
|---|---|
| Carboxylic acid-modified rosin ester represented by the formula (6) | 60 parts |
| Methoxydiethylene glycol methacrylate | 120 parts |
| Butyl acrylate | 50 parts |
| 2-Ethylhexyl acrylate | 120 parts |
| Acrylic acid | 20 parts |
| Dimethylaminoethyl methacrylate | 30 parts |
| Anionic emulsifier (tradename "Emul NC-35", product of Kao Corp.) | 6 parts |
| Ion-exchanged water | 150 parts |

Then, an adhesive was produced in the same manner as in Example I-1.

(iii) Production of adhesive sheet

An adhesive sheet was produced in the same manner as in Example I-1 with the exception that the adhesive obtained above was used.

Example I-10

(i) Production of adhesive

An emulsified monomer mixture was prepared by mixing the following components in the following amounts.

| | |
|---|---|
| Carboxylic acid-modified rosin ester represented by the formula (6) | 20 parts |
| Methoxypolyethylene glycol methacrylate (molecular weight: 468) | 160 parts |
| Butyl acrylate | 40 parts |
| 2-Ethylhexyl acrylate | 100 parts |
| Acrylic acid | 60 parts |
| Dimethylaminoethyl methacrylate | 20 parts |
| Anionic emulsifier (tradename "Emul NC-35", product of Kao Corp.) | 6 parts |
| Ion-exchanged water | 150 parts |

Then, an adhesive was produced in the same manner as in Example I-9.

(ii) Production of adhesive sheet

An adhesive sheet was produced in the same manner as in Example I-1 with the exception that the adhesive obtained above was used.

Example I-11

(i) Production of adhesive

An emulsified monomer mixture was prepared by mixing the following components in the following amounts.

| | |
|---|---|
| Carboxylic acid-modified rosin ester represented by the formula (4) | 160 parts |
| Methoxydiethylene glycol methacrylate | 20 parts |
| Butyl acrylate | 60 parts |
| 2-Ethylhexyl acrylate | 120 parts |
| Dimethylaminoethyl methacrylate | 38 parts |
| Anionic emulsifier (tradename "Emul NC-35", product of Kao Corp.) | 6 parts |
| Ion-exchanged water | 150 parts |

Then, an adhesive was produced in the same manner as in Example I-1.

(ii) Production of adhesive sheet

An adhesive sheet was produced in the same manner as in Example I-1 with the exception that the adhesive obtained above was used.

Comparative Example I-1

(i) Production of adhesive

An emulsified monomer mixture was prepared by mixing the following components in the following amounts.

| | |
|---|---|
| Carboxylic acid-modified rosin ester represented by formula (4) | 12 parts |
| Methoxydiethylene glycol methacrylate | 60 parts |
| Butyl acrylate | 60 parts |
| 2-Ethylhexyl acrylate | 200 parts |
| Acrylic acid | 40 parts |
| Dimethylaminoethyl methacrylate | 28 parts |
| Anionic emulsifier (tradename "Emul NC-35", product of Kao Corp.) | 6 parts |
| Ion-exchanged water | 150 parts |

Then, an adhesive was produced in the same manner as in Example I-1.

(ii) Production of adhesive sheet

An adhesive sheet was produced in the same manner as in Example I-1 with the exception that the adhesive obtained above was used.

Comparative Example I-2

(i) Production of adhesive

An emulsified monomer mixture was prepared by mixing the following components in the following amounts.

| | |
|---|---|
| Carboxylic acid-modified rosin ester represented by the formula (4) | 180 parts |
| Methoxydiethylene glycol methacrylate | 12 parts |
| Butyl acrylate | 48 parts |
| 2-Ethylhexyl acrylate | 60 parts |
| Acrylic acid | 12 parts |
| Dimethylaminoethyl methacrylate | 88 parts |
| Anionic emulsifier (tradename "Emul NC-35", product of Kao Corp.) | 6 parts |
| Ion-exchanged water | 150 parts |

Then, an adhesive was produced in the same manner as in Example I-1.

(ii) Production of adhesive sheet

An adhesive sheet was produced in the same manner as in Example I-1 with the exception that the adhesive obtained above was used.

Comparative Example I-3

(i) Production of adhesive

An emulsified monomer mixture was prepared by mixing the following components in the following amounts.

| | |
|---|---|
| Carboxylic acid-modified rosin ester represented by the formula (4) | 12 parts |
| Methoxydiethylene glycol methacrylate | 180 parts |
| Butyl acrylate | 30 parts |
| 2-Ethylhexyl acrylate | 30 parts |
| Acrylic acid | 140 parts |
| Dimethylaminoethyl methacrylate | 8 parts |
| Anionic emulsifier (tradename "Emul NC-35", product of Kao Corp.) | 6 parts |
| Ion-exchanged water | 150 parts |

Then, an adhesive was produced in the same manner as in Example I-1.

(ii) Production of adhesive sheet

An adhesive sheet was produced in the same manner as in Example I-1 with the exception that the adhesive obtained above was used.

Comparative Example I-4

An adhesive sheet was produced in the same manner as in Example I-1 with the exception that, as the adhesive, a water-soluble acrylic adhesive (tradename "KP-1436", product of Nippon Carbide Industries Co., Inc. was applied in an amount of 25 g/m$^2$ on dry weight basis and dried.

Comparative Example I-5

An adhesive sheet was produced in the same manner as in Example I-1 with the exception that, as the adhesive, an acrylic adhesive (tradename "SVP-100", product of SAIDEN CHEMICAL INDUSTRY CO., LTD.) which is insoluble in water and alkali aqueous solution was applied in an amount of 25 g/m$^2$ on dry weight basis and dried.

Example I-12

An adhesive sheet was produced in the same manner as in Example I-4 with the exception that the following surface stock was used.

(Production of surface stock)

A coating composition was prepared by mixing 40 parts of kaolin (tradename "Amazon 88", product of CADAM), 40 parts of kaolin (tradename "UW-90", product of EMC), 20 parts of aluminum hydroxide (tradename "Higilite H-42", product of Showa Denko Kabushiki Kaisha), 2 parts of starch phosphate (tradename "NYLGUM A-55C", product of AVEBE b.a), 12 parts of a latex (tradename "T-2580", product of Japan Synthetic Rubber Co., Ltd.) and 0.1 part of a dispersant (tradename "Aron A-9", product of TOAGOSEI CHEMICAL INDUSTRY CO., LTD.) so that a solid concentration of 60% was attained.

The coating composition thus obtained was applied to commercially available woodfree paper weighing 64 g/m$^2$ in an amount of 20 g/m$^2$ on dry weight basis and dried. The resulting paper was gloss-finished with a supercalendar, giving a surface stock.

Example I-13

An adhesive sheet was produced in the same manner as in Example I-4 with the exception that the following surface stock was used.
(Production of surface stock)

A coating composition was prepared by mixing 50 parts of kaolin (tradename "Amazon 88", product of CADAM), 50 parts of aluminum hydroxide (tradename "Higilite H-43", product of Showa Denko Kabushiki Kaisha), 20 parts of a latex (tradename "L-1392", product of ASAHI CHEMICAL INDUSTRY CO., LTD.), 5.43 parts of casein (tradename "Aracid", product of New Zealand Casein), 0.1 part of a dispersant (tradename "Aron A-9", product of TOAGOSEI CHEMICAL INDUSTRY CO., LTD., 0.3 part of an anti-foaming agent (tradename "Bismer FX-10", product of Nisshin Kagaku Kabushiki Kaisha), 0.8 part of a mold release agent (tradename "Hidorin Z-8", product of CHUKYO YUSHI CO., LTD.) and 3 parts of zinc sulfate so that a solid concentration of 47% was attained.

The coating composition thus obtained was applied to commercially available woodfree paper weighing 64 g/m$^2$ in an amount of 25 g/m$^2$ on dry weight basis and dried. The resulting paper was smooth-finished with a supercalendar, and further finished by the rewet-cast method wherein the coating layer was kept pressed on a heated metallic drum while said layer was wet, giving a surface stock.

Example I-14

An adhesive sheet was produced in the same manner as in Example I-4 with the exception that the following surface stock was used.
(Production of surface stock)

A coating composition was prepared by mixing 70 parts of kaolin (tradename "UW-90", product of EMC), 30 parts of ground calcium carbonate (tradename "Hydrocarb K-6", product of Bihoku Funka Kogyo Co., Ltd.), 1 part of starch phosphate (tradename "NYLGUM A-55C", product of Avebe b.a), 8 parts of oxidized starch (tradename "Ace A", product of Oji Cornstarch), 8 parts of SBR latex (tradename "T-2257", product of Japan Synthetic Rubber Co., Ltd.) and 0.1 part of a dispersant (tradename "Aron A-9", product of TOAGOSEI CHEMICAL INDUSTRY CO., LTD.) so that a solid concentration of 60% was attained.

The coating composition thus obtained was applied to commercially available woodfree paper weighing 64 g/m$^2$ in an amount of 20 g/m$^2$ on dry weight basis and dried to provide a pigment coating layer. The resulting paper was gloss-finished with a super calendar, giving a surface stock.

Example I-15

An adhesive sheet was produced in the same manner as in Example I-1 with the exception that the following surface stock was used.
(Production of surface stock)

A coating composition was prepared by mixing 45 parts of kaolin (tradename "UW-90", product of EMC), 55 parts of calcium carbonate (tradename "Brilliant S-15", product of Shiraishi Kogyo Kabushiki Kaisha), 21 parts of a latex (tradename "L-1392", product of ASAHI CHEMICAL INDUSTRY, CO., LTD.), 5.43 parts of casein (tradename "Aracid", product of New Zealand Casein), 0.0675 part of a dispersant (tradename "Nankarin S-1", product of Rin Kagaku Kabushiki Kaisha), 0.3 part of an anti-foaming agent (tradename "Bismer FX-10", product of Nisshin Kagaku), 0.8 part of a mold release agent (tradename "HIDORIN Z-8", product of CHUKYO YUSHI CO., LTD.) and 3 parts of zinc sulfate so that a solid concentration of 47% was attained. The obtained coating composition was applied to commercially available woodfree paper weighing 64 g/m$^2$ in an amount of 25 g/m$^2$ on dry weight basis and dried. The resulting paper was smooth-finished with a supercalendar and further finished by the rewet-cast method wherein the coating layer was kept pressed on a heated metallic drum while said layer was wet, giving a surface stock.

Example I-16

An adhesive sheet was produced in the same manner as in Example I-1 with the exception that the following release liner was used.
(Production of release liner)

A coating composition was prepared by mixing 15 parts of kaolin (tradename "UW-90", product of EMC), 5 parts of starch phosphate (tradename "NYLGUM A-55C", product of Avebe), 80 parts of polyvinyl alcohol (tradename "Kuraray PVA-103", product of KURARAY CO., LTD.) and 0.1 part of a dispersant (tradename "Aron A-9", product of TOAGOSEI CHEMICAL INDUSTRY CO., LTD.) so that a solid concentration of 40% was attained.

The coating composition thus obtained was applied to commercially available woodfree paper weighing 64 g/m$^2$ in an amount of 5 g/m$^2$ on dry weight basis and dried to provide a sealing layer. The resulting paper was smooth-finished with a supercalendar, giving a release liner support.

Subsequently, to the sealing layer of the release liner support thus obtained, a coating liquid containing 100 parts of a solvent-type silicone release agent (tradename "LTC-300B", product of TORAY DOW CORNING) and 0.8 part of a catalyst (tradename "SRX-212", product of TORAY DOW CORNING) was applied in an amount of 1.0 g/m$^2$ on dry weight basis and cured by heating, giving a release liner.

Example I-17

An adhesive sheet was produced in the same manner as in Example I-16 with the exception that double-side clay-coated paper (tradename "Topkote <73>", product of New Oji Paper Co., Ltd.) was used as the release liner support.

Example I-18

An adhesive sheet was produced in the same manner as in Example I-16 with the exception that the following surface stock was used.

(Production of surface stock)

A coating composition was prepared by mixing 100 parts of kaolin (tradename "UW-90", product of EMC), 1 part of strach phosphate (tradename "Nylgum A-55C", product of Avebe), 8 parts of oxidized starch (tradename "Ace A", product of Oji Cornstarch), 8 parts of SBR latex (tradename "T-2257", product of Japan Synthetic Rubber Co., Ltd.) and 0.1 part of a dispersant (tradename "Aron A-9", product of TOAGOSEI CHEMICAL INDUSTRY CO., LTD.) so that a solid concentration of 60% was attained.

The coating composition thus obtained was applied to commercially available woodfree paper weighing 64 g/m$^2$ in an amount of 20 g/m$^2$ on dry weight basis and dried to provide a coating layer. The resulting paper was gloss-finished with a supercalendar, giving a surface stock.

Example I-19

An adhesive sheet was produced in the same manner as in Example I-16 with the exception that the following surface stock was used.

(Production of surface stock)

A coating composition was prepared by mixing 70 parts of kaolin (tradename "UW-90", product of EMC), 30 parts of calcined kaolin (tradename "Ansilex", product of EMC), 1 part of starch phosphate (tradename "Nylgum A-55C", product of Avebe), 8 parts of oxidized starch (tradename "Ace A", product of Oji Cornstarch Kabushiki Kaisha), 8 parts of SBR latex (tradename "T-2257", product of Japan Synthetic Rubber Co., Ltd.) and 0.1 part of a dispersant (tradename "Aron A-9", product of TOAGOSEI CHEMICAL INDUSTRY CO., LTD.) so that a solid concentration of 60% was attained.

The coating composition thus obtained was applied to commercially available woodfree paper weighing 64 g/m$^2$ in an amount of 20 g/m$^2$ on dry weight basis and dried to provide a pigment coating layer. The resulting paper was gloss-finished with a supercalendar, giving a surface stock.

Example I-20

An adhesive sheet was produced in the same manner as in Example I-16 with the exception that the following release liner support was used.

(Production of release liner support)

A polymerization tube made of glass was charged with 100 g of D,L-lactide, 0.01% by weight of stannous octoate and 0.03% by weight of lauryl alcohol. After one-hour deaeration in vacuo, the tube was sealed. The sealed tube was heated at 200° C. for 4 hours to carry out ring opening polymerization, giving poly(D,L-lactic acid) as the reaction product. The obtained resin had an average molecular weight of 30,000. The obtained resin was laminated to commercially available kraft paper weighing 72 g/m$^2$ to form a layer having a thickness of 20 μm, giving a release liner support.

Example I-21

An adhesive sheet was produced in the same manner as in Example I-16 with the exception that the following release liner support was used.

(Production of release liner support)

A polymerization vessel made of glass was charged with 100 g of D,L-lactide, and dry nitrogen was passed through the vessel for about 1 hour to replace the air therein with nitrogen. The polymerization vessel was heated to 200° C. to carry out direct dehydration polycondensation, giving poly(D,L-lactic acid). During the polymerization, nitrogen was passed through the polymerization vessel at a rate of 200 ml/min. for the purpose of replacing the atmosphere and transporting the produced water vapor. The reaction was carried out without using any catalyst, and the reaction time was 10 hours. The obtained resin had an average molecular weight of 3,000. The obtained resin was melted, withdrawn and dissolved in tetrahydrofuran. A commercially available kraft paper weighing 72 g/m$^2$ was immersed in the obtained solution to impregnate the resin into the paper. The resulting paper was sandwitched between sheaves of filter paper, and pressure was applied on the filter paper to make the resin uniformly penetrate through the kraft paper and to remove excess resin. The resulting kraft paper was dried with air and treated with a supercalendar, giving a release liner support.

Example I-22

An adhesive sheet was produced in the same manner as in Example I-16 with the exception that commercially available polylactic acid film (tradename "Lactie", product of Shimadzu Corp.) was used as both of the surface stock and the release liner support.

Example I-23

An adhesive sheet was produced in the same manner as in Example I-16 with the exception that the surface stock used was a commercially available water-soluble polymer film (a 50 μm-thick film mainly comprising polyethylene oxide, tradename "Paogen", product of Daiichi Kogyo Seiyaku Kabushiki Kaisha) and that the release liner used was produced in the same manner as in Example I-16 with the exception of using said water-soluble film as the release liner support.

The adhesive sheets obtained above were evaluated by the following procedures. The results are shown in Tables 1 and 2. Table 1 shows the results obtained by evaluating the recycling suitability of the labels (not including the release liner), and Table 2 shows the results obtained by evaluating the recycling suitability of adhesive sheets as such (including the release liner).

<Evaluation Items>

Adhesion

According to the test method for original adhesion as defined in JIS-Z-0237, the adhesive sheet was tested for adhesion (unit: g/25 mm) after storage under the following two conditions.

Condition A: The adhesive sheet was stored in an atmosphere maintained at a temperature of 23°±2° C. and a relative humidity of 65±5% for 7 days after production, and then tested for adhesion.

Condition B: The adhesive sheet was stored in an atmosphere maintained at a temperature of 40°±2° C. and a relative humidity of 90±5% for 7 days after production, and then tested for adhesion.

Cohesion

The cohesion of the adhesive sheet was tested by the test method for original holding power as defined in JIS-Z-0237, and evaluated according to the criteria shown below.

The adhesive sheet was stored in an atmosphere maintained at a temperature of 23°±2° C. and a relative humidity of 65±15% for 7 days after production, and used as the test sample.

A: The weight held for 5 minutes or more.

B: The weight fell within 5 minutes.

Water redispersibility of adhesive

The adhesive sheet was immersed in water at 20° C., and the adhesive layer surface was rubbed with a finger 10 times in the water. The behavior of the adhesive was evaluated according to the following criteria.

A: The adhesive layer was redispersed in the form of fine particles having no stickiness.

B: The adhesive layer was redispersed in the form of relatively coarse particles having a slight degree of stickiness.

C: The adhesive layer was dissolved in and contaminated the water.

D: No change was observed in stickiness of the adhesive layer, and the adhesive layer was cohered.

Recycling suitability (Production of evaluation samples)

(i) Examples I-1 to I-15 and Comparative Examples I-1 to I-6

On the assumption that the adhesive sheet is used as an address label on an envelop, the release liner was removed from the adhesive sheets and the resulting adhesive label was stuck on commercially available woodfree paper weighing 64 g/m² to provide an evaluation sample.

(ii) Examples I-16 to I-21 and Example I-1

On the assumption that the adhesive sheet including the release liner is recycled, the adhesive sheet as such was used as an evaluation sample.

(iii) Examples I-22 and I-23

On the assumption that the adhesive sheet including the release liner is used as mixed with magazine paper or the like, a mixture consisting of the adhesive sheet and commercially available woodfree paper weighing 64 g/m² in the ratio of 1:1 was used as an evaluation sample.

(Evaluation)

Water was added to 50 g of the sample so that the resulting mixture had a pulp concentration of 3%. The mixture was treated with a TAPPI disintegrator at 150,000 rpm, and then dehydrated until a pulp concentration of 15% was attained. Then, 1.5 g of an 18% aqueous solution of NaOH and 1.8 g of a 10% solution of a deinking agent (tradename "DI-600", product of Kao Corp.) were added, and the resulting mixture was allowed to stand at 40° C. for 20 minutes and dehydrated until a pulp concentration of 25% was attained. Subsequently, 3.62 g of an 18% aqueous solution of NaOH, 3.85 g of a 30% aqueous solution of $Na_2SiO_3$ and 5 g of a 6% aqueous solution of $H_2O_2$ were added, and the resulting mixture was kneaded with a twin blade-kneader for 5 minutes.

Thereafter, the mixture was allowed to stand for 120 minutes as maintained at 55° C., and diluted with water to a pulp concentration of 17.5%. Second kneading was carried out in the same manner as above. Then, the mixture was further diluted with water to a pulp concentration of 1%. The obtained dispersion of 1% pulp was treated with a flotator for 10 minutes for flotation process. The produced foam was removed with a scraper, and the obtained flotation separation liquid was further washed with 800 ml of water and dehydrated until a concentration of 13% was attained.

The thus-obtained pulp dispersion was diluted with water to a concentration of 0.3%, and made into a handsheet. The handsheet was visually checked for the remaining non-disintegrated matter and evaluated according to the following criteria.

(Evaluation criteria for recycling suitability)

A: Substantially no non-disintegrated matter observed.

B: Small amount of non-disintegrated matter observed but practically negligible.

C: Fairly large amount of non-disintegrated matter observed.

Overall evaluation

From the above test results, the performance of the adhesive sheet as a recyclable adhesive sheet was evaluated according to the following criteria.

A: Remarkably excellent

B: Excellent

C: Poor

D: Not subject to recycling

TABLE 1

|  | Adhesion | | | Water-redispersibility | Recycling suitability (label) | Overall evaluation |
| --- | --- | --- | --- | --- | --- | --- |
|  | Condition A | Condition B | Cohesion |  |  |  |
| Ex. I-1 | 1200 | 1100 | A | A | A | A |
| Ex. I-2 | 1100 | 1000 | A | A | A | A |
| Ex. I-3 | 1100 | 1000 | A | A | A | A |
| Ex. I-4 | 1400 | 1100 | A | A | A | A |
| Ex. I-5 | 1000 | 950 | A | A | A | A |
| Ex. I-6 | 1100 | 1000 | A | A | A | A |
| Ex. I-7 | 1000 | 950 | A | A | A | A |
| Ex. I-8 | 1600 | 1500 | A | B | B | B |
| Ex. I-9 | 1400 | 1100 | A | A | A | A |
| Ex. I-10 | 1100 | 1000 | A | A | A | A |
| Ex. I-11 | 1300 | 1100 | A | B | A | B |
| Comp. Ex. I-1 | 1200 | 1050 | A | D | C | D |
| Comp. Ex. I-2 | 300 | 200 | B | A | A | C |
| Comp. Ex. I-3 | 250 | 200 | B | A | A | C |
| Comp. Ex. I-4 | 1400 | 250 | B | C | A | C |
| Comp. Ex. I-5 | 1300 | 1250 | A | D | C | D |
| Ex. I-12 | 1200 | 1100 | A | A | A | A |
| Ex. I-13 | 1100 | 1000 | A | A | B | B |
| Ex. I-14 | 1300 | 600 | A | A | B | B |
| Ex. I-15 | 1200 | 200 | A | A | A | C |

TABLE 2

|  | Adhesion | | Cohesion | Water-redispersibility | Recycling suitability (sheet) | Overall evaluation |
| --- | --- | --- | --- | --- | --- | --- |
|  | Condition A | Condition B | | | | |
| Ex. I-16 | 1200 | 1100 | A | A | B | A |
| Ex. I-17 | 1200 | 1100 | A | A | B | A |
| Ex. I-18 | 1100 | 1000 | A | A | B | A |
| Ex. I-19 | 1100 | 1000 | A | A | B | A |
| Ex. I-20 | 1200 | 1100 | A | A | B | A |
| Ex. I-21 | 1200 | 1100 | A | A | B | A |
| Ex. I-22 | 1200 | 1100 | A | A | B | A |
| Ex. I-23 | 1200 | 1100 | A | A | B | A |
| Ex. I-1 | 1200 | 1100 | A | A | C | B |

As clear from the results shown in Tables 1 and 2, the adhesive of the adhesive sheet of the present invention is readily redispersed in water, and thus the adhesive sheet is excellent in recyclability of the pulp. In addition, the adhesive sheet of the present invention is satisfactorily usable from the standpoint of adhesion properties.

From the comparison of Examples I-1 to I-11 with Comparative Examples I-1 to I-3, it is clear that an adhesive sheet which is well balanced among water redispersibility, adhesion and cohesion can be obtained only when the monomers (a), (b) and (c) are used in specific proportions.

The adhesive sheet of Example I-8, which is prepared using a rosin ester monomer as monomer (a), is slightly inferior in water-redispersibility to the adhesive sheets prepared using a carboxylic acid-modified rosin ester monomer, but is excellent in humidity resistance.

The adhesive sheet of Example I-11, which is prepared using a copolymer not containing monomer (d), is slightly inferior in water-redispersibility to the adhesive sheets of other Examples.

The adhesive sheets of Examples I-12 to I-15 comprise pigment-coated paper as the surface stock. The adhesive sheets of Examples 1-14 and I-15, whose pigment coating layers contain calcium, are deteriorated when exposed to a high humidity, resulting in reduced adhesion. Therefore, it is preferred to provide a pigment coating layer which is free from calcium.

The adhesive sheets of Examples I-16 to I-19 are prepared using, in lieu of the polyethylene-laminated release liner, a release liner comprising a release agent layer provided on a kaolin-containing sealing layer or clay-coated paper. These adhesive sheets are fully recyclable even when mixed with waste paper. When the polyethylene-laminated release liner is mixed with waste paper, the resulting mixture is not suitable for recycling, as the adhesive sheet of Example I-1 shown at the bottom of Table 2.

Examples I-20 and I-21 illustrate the novel release liners, and a release liner support having a polylactic acid polymer layer is used in Example I-20, and a release liner support impregnated with a polylactic acid polymer is used in Example I-21. The adhesive sheets comprising the above release liners are fully recyclable even when mixed with waste paper.

A polylactic acid polymer film and a film composed of a water-soluble polymer are used in Examples I-22 and I-23, respectively, as the surface stock and the release liner. It is not intended to obtain recycled pulp from the adhesive sheets prepared using films as the surface stock and the release liner, since such adhesive sheets do not contain paper. However, such adhesive sheets are often mixed with waste paper such as magazine and the like. The adhesive sheets of Examples I-22 and I-23, even if mixed with waste paper, do not adversely affect the recycling of the waste paper.

Consequently, the adhesive sheets of the present invention are very suitable for practical use, since they can be easily disposed of by means of a conventional equipment for recycling waste paper.

The following Examples and Comparative Examples illustrate the removable adhesive sheet of the present invention.

Example II-1

(Synthesis of carboxyl acid-modified rosin ester)

A flask equipped with a stirrer, an exhaust tube, a dropping funnel, a nitrogen inlet tube and a thermometer was charged with 70 parts of methacrylic acid and 90 parts of epichlorohydrin, and under nitrogen gas, the charge was heated to 100° C. and maintained at the same temperature for 2 hours. Then, 300 parts of fully dissolved abietic acid rosin was added, and the mixture was maintained at 230° C. for 2 hours. Subsequently, 125 parts of glutaric anhydride was added, and the resulting mixture was maintained at 230° C. for 2 hours to synthesize the carboxylic acid-modified rosin ester represented by the formula (4).

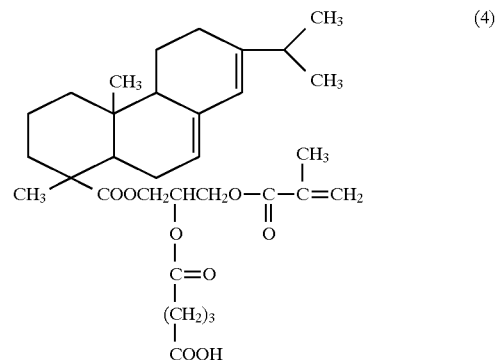

(Production of adhesive)

An emulsified monomer mixture was prepared by mixing the following components in the following amounts.

| | |
| --- | --- |
| Carboxylic acid-modified rosin ester represented by the formula (4) | 15 parts |
| Methoxydiethylene glycol methacrylate | 15 parts |
| Butyl acrylate | 30 parts |
| 2-Ethylhexyl acrylate | 30 parts |
| Acrylic acid | 5 parts |
| Methyl methacrylate | 5 parts |

| | |
|---|---|
| Anionic emulsifier (tradename "Emul NC-35", product of Kao Corp.) | 1.5 parts |
| Ion-exchanged water | 90 parts |

Then, a flask equipped with a stirrer, a cooler, a dropping funnel, a nitrogen inlet tube and a thermometer was charged with 90 parts of ion-exchanged water, 0.5 part of potassium peroxide and 1 part of octyl mercaptan, and the charge was heated to 80° C. while replacing the air in the flask with nitrogen. Thereafter, one sixth of the above-obtained emulsified monomer mixture was added dropwise. When the degree of conversion reached 90%, the remaining portion of the emulsified monomer mixture was added dropwise over a period of 3 hours to carry out polymerization. After completion of the dropwise addition, the resulting mixture was aged at 80° C. for 3 hours to complete the reaction. Subsequently, the contents of the flask were cooled to 40° C., and aqueous ammonia was added so as to adjust the pH value to about 7 to thereby carry out neutralization reaction. After completion of the reaction, the reaction mixture was vigorously stirred, giving a copolymer in the form of an aqueous emulsion.

To the emulsion thus obtained was added diglycerol triglycidyl ether (tradename "Denacol EX-421", product of NAGASE & CO., LTD.) as a crosslinking agent in an amount of 1 part relative to 100 parts of the copolymer in said emulsion. The mixture was stirred to homogeneity, giving an adhesive to be used in the present invention.

(Production of adhesive sheet)

The adhesive obtained above was applied to a commercially available polyethylene-laminated release liner in an amount of 25 g/m² on dry weight basis and dried, and the resulting release liner was laminated on commercially available woodfree paper weighing 64 g/m², giving a removable adhesive sheet of the present invention.

Example II-2

(Synthesis of carboxyl acid-modified rosin ester)

The carboxylic acid-modified rosin ester represented by the formula (6) was produced in the same manner as in Example II-1 with the exception that 60 parts of acrylic acid and 140 parts of adipic anhydride were used in lieu of methacrylic acid and glutaric anhydride, respectively.

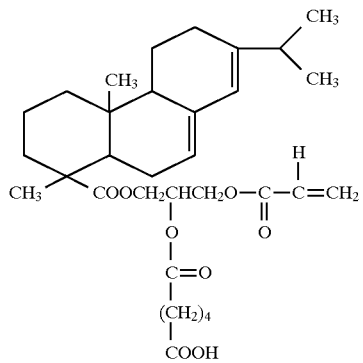

(6)

(Production of adhesive)

An emulsified monomer mixture was prepared by mixing the following components in the following amounts.

| | |
|---|---|
| Carboxylic acid-modified rosin ester represented by the formula (6) | 5 parts |
| Methoxypolyethylene glycol methacrylate (molecular weight: 468) | 40 parts |
| Butyl acrylate | 10 parts |
| 2-Ethylhexyl acrylate | 20 parts |
| Acrylic acid | 5 parts |
| Dimethylaminoethyl methacrylate | 20 parts |
| Anionic emulsifier (tradename "Emul NC-35", product of Kao Corp.) | 1.5 parts |
| Ion-exchanged water | 90 parts |

Using the thus obtained monomer mixture, a copolymer in the form of an aqueous emulsion was produced in the same manner as in Example II-1.

To the obtained emulsion was added glycerol diglycidyl ether (tradename "Denacol EX-313", product of NAGASE & CO., LTD.) as a crosslinking agent in an amount of 2 parts relative to 100 parts of the copolymer in said emulsion. The mixture was stirred to homogeneity, giving an adhesive to be used in the present invention.

(Production of adhesive sheet)

A removable adhesive sheet was produced in the same manner as in Example II-1 with the exception that the adhesive obtained above was used.

Example II-3

(Production of adhesive)

An emulsified monomer mixture was prepared by mixing the following components in the following amounts.

| | |
|---|---|
| Carboxylic acid-modified rosin ester represented by the formula (4) | 40 parts |
| Phenoxydiethylene glycol acrylate | 5 parts |
| Butyl acrylate | 10 parts |
| 2-Ethylhexyl acrylate | 24 parts |
| Acrylic acid | 20 parts |
| Methyl methacrylate | 1 part |
| Anionic emulsifier (tradename "Emul NC-35", product of Kao Corp.) | 1.5 parts |
| Ion-exchanged water | 90 parts |

Using the thus-obtained monomer mixture, a copolymer in the form of an aqueous emulsion was produced in the same manner as in Example II-1.

To the obtained emulsion was added trimethylolpropane diglycidyl ether (tradename "Denacol EX-321", product of NAGASE & CO., LTD.) as a crosslinking agent in an amount of 3 parts relative to 100 parts of the copolymer in said emulsion. The mixture was stirred to homogeneity, giving an adhesive to be used in the present invention.

(Production of adhesive sheet)

A removable adhesive sheet was produced in the same manner as in Example II-1 with the exception that the adhesive obtained above was used.

Example II-4

(Production of adhesive)

An adhesive was produced in the same manner as in Example II-1 with the exception that the emulsified monomer mixture was prepared by mixing the following components in the following amounts and that 10 parts of diglycerol triglycidyl ether (tradename "Denacol EX-421", product of NAGASE & CO., LTD.) was added as the crosslinking agent.

| Carboxylic acid-modified rosin ester represented by the formula (4) | 20 parts |
|---|---|
| Methoxypolyethylene glycol methacrylate (molecular weight: 468) | 15 parts |
| Butyl acrylate | 20 parts |
| 2-Ethylhexyl acrylate | 20 parts |
| Acrylic acid | 20 parts |
| Dimethylaminoethyl methacrylate | 5 parts |
| Anionic emulsifier (tradename "Emul NC-35", product of Kao Corp.) | 1.5 parts |
| Ion-exchanged water | 90 parts |

(Production of adhesive sheet)

A removable adhesive sheet was produced in the same manner as in Example II-1 with the exception that the adhesive obtained above was used.

Example II-5

(Production of adhesive)

An adhesive was produced in the same manner as in Example II-1 with the exception that the emulsified monomer mixture was prepared by mixing the following components in the following amounts and that 0.1 part of diglycerol triglycidyl ether (tradename "Denacol EX-421", product of NAGASE & CO., LTD.) was added as a crosslinking agent in an amount of 0.1 part.

| Carboxylic acid-modified rosin ester represented by the formula (4) | 35 parts |
|---|---|
| Methoxypolyethylene glycol methacrylate (molecular weight: 468) | 34 parts |
| 2-Ethylhexyl acrylate | 20.5 parts |
| Acrylic acid | 0.5 part |
| Dimethylaminoethyl methacrylate | 10 parts |
| Anionic emulsifier (tradename "Emul NC-35", product of Kao Corp.) | 1.5 parts |
| Ion-exchanged water | 90 parts |

(Production of adhesive sheet)

A removable adhesive sheet was produced in the same manner as in Example II-1 with the exception that the adhesive obtained above was used.

Example II-6

(Production of adhesive)

A monomer mixture was prepared by mixing the following components in the following amounts.

| Carboxylic acid-modified rosin ester represented by the formula (4) | 30 parts |
|---|---|
| Methoxypolyethylene glycol methacrylate (molecular weight: 468) | 13 parts |
| 2-Ethylhexyl acrylate | 50 parts |
| Acrylic acid | 5 parts |
| Methyl methacrylate | 2 parts |
| Ethyl acetate | 150 parts |

Then, a flask equipped with a stirrer, a cooler, a dropping funnel, a nitrogen inlet tube and a thermometer was charged with 150 parts of ethyl acetate, 0.5 part of benzoyl peroxide and 1 part of octyl mercaptan, and the charge was heated to 80° C. while replacing the air in the flask with nitrogen. Thereafter, one sixth of the above-obtained monomer mixture was added dropwise. When the degree of conversion reached 90%, the remaining portion of the monomer mixture was added dropwise over a period of 3 hours to carry out polymerization. After completion of the dropwise addition, the resulting mixture was aged at 80° C. for 3 hours to complete the reaction, and cooled to 20° C.

Diphenylmethane-4,4'-diisocyanate (tradename "MDI-LT", product of Mitsui Toatsu Chemicals, Inc.) was added as a crosslinking agent in an amount of 8 parts relative to 100 parts by weight of the above obtained copolymer. The mixture was stirred to homogeneity, giving an adhesive.

(Production of adhesive sheet)

A removable adhesive sheet was produced in the same manner as in Example II-1 with the exception that the adhesive obtained above was used.

Example II-7

A removable adhesive sheet was produced using an adhesive produced in the same manner as in Example II-6 with the exception that 2 parts of bis(4-isocyanate-cyclohexyl)methane (tradename "Desmodur W", product of Sumitomo-Byer Urethane) was used as the crosslinking agent.

Comparative Example II-1

An adhesive sheet was produced in the same manner as in Example II-1 with the exception that no crosslinking agent was added.

Comparative Example II-2

A removable adhesive sheet was produced in the same manner as in Example II-1 with the exception that the crosslinking agent was added in an amount of 12 parts.

Comparative Example II-3

(Production of adhesive)

A removable adhesive sheet was produced in the same manner as in Example II-1 with the exception that the emulsified monomer mixture was prepared by mixing the following components in the following amounts.

| Carboxylic acid-modified rosin ester represented by the formula (4) | 3 parts |
|---|---|
| Methoxydiethylene glycol methacrylate | 45 parts |
| Butyl acrylate | 20 parts |
| 2-Ethylhexyl acrylate | 25 parts |
| Acrylic acid | 2 parts |
| Methyl methacrylate | 5 parts |
| Anionic emulsifier (tradename "Emul NC-35", product of Kao Corp.) | 1.5 parts |
| Ion-exchanged water | 90 parts |

Comparative Example II-4

(Production of adhesive)

A removable adhesive sheet was produced in the same manner as in Example II-1 with the exception that the emulsified monomer mixture was prepared by mixing the following components in the following amounts.

| Carboxylic acid-modified rosin ester represented by the formula (4) | 45 parts |
|---|---|
| Methoxydiethylene glycol methacrylate | 3 parts |
| Butyl acrylate | 20 parts |
| 2-Ethylhexyl acrylate | 25 parts |
| Acrylic acid | 2 parts |
| Methyl methacrylate | 5 parts |
| Anionic emulsifier (tradename "Emul NC-35", product of Kao Corp.) | 1.5 parts |
| Ion-exchanged water | 90 parts |

Example II-8

A removable adhesive sheet was produced in the same manner as in Example II-1 with the exception that the following release liner was used.

(Production of release liner)

A coating composition was prepared by mixing 15 parts of kaolin (tradename "UW-90", product of EMC), 5 parts of starch phosphate (tradename "NYLGUM A-55C", product of Avebe), 80 parts of polyvinyl alcohol (tradename "Kuraray PVA-103", product of KURARAY CO., LTD.) and 0.1 part of a dispersant (tradename "Aron A-9", product of TOAGOSEI CHEMICAL INDUSTRY CO., LTD.) so that a solid concentration of 40% was attained. The composition was applied to commercially available woodfree paper weighing 64 g/m$^2$ in an amount of 5 g/m$^2$ on dry weight basis and dried to provide a sealing layer. The resulting paper was smooth-finished with a supercalendar, giving a release liner support.

Then, a mixture of 100 parts of a solvent-type silicone release agent (tradename "LTC-300B", product of TORAY DOW CORNING) and 0.8 part of a catalyst (tradename "SRX-212", product of TORAY DOW CORNING) was applied to the sealing layer of the support and cured by heating, giving a release liner.

Example II-9

A removable adhesive sheet was produced in the same manner as in Example II-8 with the exception that double-side clay-coated paper (tradename "TopKote <73>", product of New Oji Paper Co., Ltd.) was used as the release liner support.

Example II-10

A removable adhesive sheet was produced in the same manner as in Example II-8 with the exception that the following surface stock was used.
(Production of surface stock)

A coating composition was prepared by mixing 100 parts of kaolin (tradename "UW-90", product of EMC), 1 part of starch phosphate (tradename "Nylgum A-55C", product of Avebe), 8 parts of oxidized starch (tradename "Ace A", product of Oji Cornstarch), 8 parts of an SBR latex (tradename "T-2257", product of Japan Synthetic Rubber Co., Ltd.) and 0.1 part of a dispersant (tradename "Aron A-9", product of TOAGOSEI CHEMICAL INDUSTRY CO., LTD.) so that a solid concentration of 60% was attained. The coating composition thus obtained was applied to commercially available woodfree paper weighing 64 g/m$^2$ in an amount of 20 g/m$^2$ on dry weight basis and dried to provide a pigment coating layer. The resulting paper was gloss-finished with a supercalendar, giving a surface stock.

Example II-11

A removable adhesive sheet was produced in the same manner as in Example II-8 with the exception that the following surface stock was used.
(Production of surface stock)

A coating composition was prepared by mixing 70 parts of kaolin (tradename "UW-90", product of EMC), 30 parts of calcined kaolin (tradename "Ansirex", product of EMC), 1 part of starch phosphate (tradename "Nylgum A-55C", product of Avebe), 8 parts of oxidized starch (Tradename "Ace A", product of Oji Cornstarch), 8 parts of SBR latex (tradename "T-2257", product of Japan Synthetic Rubber Co., Ltd.) and 0.1 part of a dispersant (tradename "Aron A-9", product of TOAGOSEI CHEMICAL INDUSTRY CO., LTD.) so that a solid concentration of 60% was attained. The coating composition thus obtained was applied to commercially available woodfree paper weighing 64 g/m$^2$ in an amount of 20 g/m$^2$ on dry weight basis and dried to provide a pigment coating layer. The resulting paper was gloss-finished with a supercalendar, giving a surface stock.

Example II-12

A removable adhesive sheet was prepared in the same manner as in Example II-8 with the exception that the following surface stock was used.
(Production of surface stock)

A coating composition was prepared by mixing 70 parts of kaolin (tradename "UW-90", product of EMC), 30 parts of ground calcium carbonate (tradename "Hydrocarb K-6", product of Bihoku Funka Kogyo Co., Ltd.), 1 part of starch phosphate (tradename "Nylgum A-55C", product of Avebe), 8 parts of oxidized starch (tradename "Ace A", product of Oji Cornstarch), 8 parts of SBR latex (tradename "T-2257", product of Japan Synthetic Rubber Co., Ltd.) and 0.1 part of a dispersant (tradename "Aron A-9", product of TOAGOSEI CHEMICAL INDUSTRY CO., LTD.) so that a solid concentration of 60% was attained. The coating composition thus obtained was applied to commercially available woodfree paper weighing 64 g/m$^2$ in an amount of 20 g/m$^2$ on dry weight basis and dried to provide a pigment coating layer. The resulting paper was gloss-finished with a supercalendar, giving a surface stock.

The adhesive sheets obtained above were evaluated by the following procedures. The results were shown in Table 3.
<Evaluation Items>
Adhesion According to the test method for original adhesion as defined in JIS Z-0237, the adhesive sheet was tested for adhesion (unit: g/25 mm) after storage under the following two conditions.

Condition A: The adhesive sheet was stored in an atmosphere maintained at a temperature of 23°±2° C. and a relative humidity of 65±5% for 14 days after production, and then tested for adhesion.

Condition B: The adhesive sheet was stored under the condition of Condition A, and then stored in an atmosphere maintained at a temperature of 40°±2° C. and a relative humidity of 90±5% for 7 days. Thereafter, the adhesive sheet was tested for adhesion.

Removability

The adhesive sheet was stored in an atmosphere maintained at a temperature of 23°±2° C. and a relative humidity of 65±15% for 14 days after production, and then used as the test sample. The test sample was affixed to a commercially available rigid polyvinyl chloride sheet. One day later, the test sample was peeled off at a speed of 5 m/min. The removability was evaluated according to the following criteria.

A: The adhesive sheet was peeled off without leaving an adhesive residue on the article.

B: The stock of the adhesive sheet broke at the time of peeling off, or the adhesive remained on the PVC sheet.

Water redispersibility of adhesive

The adhesive sheet was immersed in water at 20° C., and the adhesive layer surface was rubbed with a finger 10 times in the water. The behavior of the adhesive was evaluated according to the following criteria.

A: The adhesive layer was redispersed in the form of fine particles having no stickiness.

B: No change was observed in stickiness of the adhesive layer, and the adhesive layer was cohered.

Recycling suitability

For evaluation of recycling suitability, the adhesive sheets of Examples II-1 to II-7 and Comparative Examples II-1 to II-4 were tested by the method illustrated below in (Evaluation of adhesive label), and the adhesive sheets of Examples II-8 to II-12 were tested by the method illustrated below in (Evaluation of adhesive sheet).

(Evaluation of adhesive label)

On the assumption that the adhesive sheet is used as an address label on a woodfree paper envelop, the release liner was removed from the adhesive sheet and the remaining adhesive label was stuck on commercially available woodfree paper weighing 64 g/m$^2$ to provide a evaluation sample.

Water was added to 50 g of the sample until a pulp concentration of 3% was reached. The mixture was treated with a TAPPI disintegrator at 150000 rpm, and dehydrated until a pulp concentration of 15% was attained. Then, 1.5 g of an 18% aqueous solution of NaOH and 1.8 g of a 10% solution of a deinking agent (tradename "DI-600", product of Kao Corp.) were added, and the resulting mixture was allowed to stand at 40° C. for 20 minutes and dehydrated until a pulp concentration of 25% was attained. Then, 3.62 g of an 18% aqueous solution of NaOH, 3.85 g of a 30% aqueous solution of $Na_2SiO_3$ and 5 g of a 6% aqueous $H_2O_2$ solution were added, and the resulting mixture was kneaded with a twin blade-kneader for 5 minutes.

Subsequently, the mixture was allowed to stand at 55° C. for 120 minutes as maintained at 55° C., and diluted with water to a pulp concentration of 17.5%. Second kneading was carried out in the same manner as above. Then, the mixture was further diluted with water to a pulp concentration of 1%. The obtained dispersion of 1% pulp was treated with a flotator for 10 minutes for flotation process. The produced foam was removed with a scraper, and the obtained flotation separation liquid was further washed with 800 ml of water, and dehydrated to a concentration of 13%. The obtained pulp dispersion was diluted with water to a concentration of 0.3% and made into a handsheet. The handsheet was visually checked for the remaining non-disintegrated matter and evaluated according to the following criteria.

(Criteria for recycling suitability evaluation)

A: Substantially no non-disintegrated matter observed.

B: Small amount of non-disintegrated matter observed, but practically negligible.

C: Fairly large amount of non-disintegrated matter observed.

(Evaluation of adhesive sheet)

On the assumption that the adhesive sheet including the release liner is recycled as waste paper, using the adhesive sheet as such as the evaluation sample and following the procedure of the above evaluation of the adhesive label, a handsheet was prepared and visually checked for non-disintegrated matter and evaluated according to the following criteria.

(Criteria for recycling suitability evaluation)

A: Substantially no non-disintegrated matter observed.

B: Small amount of non-disintegrated matter observed, but practically negligible.

C: Fairly large amount of non-disintegrated matter observed.

Overall evaluation

From the above test results, the performance of the adhesive sheet as a recyclable removable adhesive sheet was evaluated according to the following criteria.

A: The adhesive sheet has excellent removability. In addition, the adhesive sheet can be recycled in the form of an adhesive label comprising a surface stock and an adhesive layer as laminated, and the adhesive shows satisfactory adhesion which is not substantially reduced by humidity or heat. Alternatively, the adhesive sheet can be recycled in the form of an adhesive sheet comprising a surface stock, an adhesive layer and a release liner as laminated in this order, and the adhesive shows satisfactory adhesion which is not substantially reduced by humidity or heat.

B: The adhesive sheet has excellent removability. In addition, the adhesive sheet can be recycled in the form of an adhesive label comprising a surface stock and an adhesive layer as laminated, and the adhesive shows satisfactory adhesion which is slightly reduced by humidity or heat but to a practically negligible extent. Alternatively, the adhesive sheet can be recycled in the form of an adhesive sheet comprising a surface stock, an adhesive layer and a release liner as laminated in this order, and the adhesive shows satisfactory adhesion which is slightly reduced by humidity or heat but to a practically negligible extent.

C: The adhesive sheet is removable and recyclable, but has poor adhesion.

D: The adhesive sheet has poor removability, or not subject to recycling.

TABLE 3

| | Adhesion | | Remov- | Water Redispers- | Recycling suitability | | Overall |
|---|---|---|---|---|---|---|---|
| | Condition A | Condition B | ablility | ibility | Label | Sheet | evaluation |
| Ex. II-1 | 700 | 650 | A | A | A | (C) | A |
| Ex. II-2 | 600 | 550 | A | A | A | — | A |
| Ex. II-3 | 600 | 550 | A | A | A | — | A |
| Ex. II-4 | 500 | 400 | A | A | B | — | A |
| Ex. II-5 | 800 | 700 | A | A | A | — | A |
| Ex. II-6 | 800 | 700 | A | A | A | — | A |
| Ex. II-7 | 700 | 650 | A | A | B | — | A |
| Comp. Ex. II-1 | 1200 | 1200 | B | A | C | — | D |
| Comp. Ex. II-2 | 300 | 200 | A | B | C | — | D |
| Comp. Ex. II-3 | 200 | 150 | A | A | A | — | C |
| Comp. Ex. II-4 | 200 | 150 | A | A | A | — | C |
| Ex. II-8 | 700 | 650 | A | A | — | B | A |
| Ex. II-9 | 700 | 650 | A | A | — | B | A |
| Ex. II-10 | 600 | 550 | A | A | — | B | A |
| Ex. II-11 | 600 | 550 | A | A | — | B | A |

TABLE 3-continued

| | Adhesion | | Remov-ablility | Water Redispers-ibility | Recycling suitability | | Overall evaluation |
|---|---|---|---|---|---|---|---|
| | Condition A | Condition B | | | Label | Sheet | |
| Ex. II-12 | 650 | 400 | A | A | — | B | B |
| Ex. II-13 | 500 | 400 | A | A | — | B | A |

As is clear from the results shown in Table 3, the removable adhesive sheet of the present invention can be used as an adhesive label or adhesive sheet both of which is excellent in recyclability of the pulp, since the adhesive of the adhesive sheet is readily redispersed in water. In addition, the adhesive sheet of the present invention are fully usable from the standpoint of the adhesion properties.

We claim:

1. An adhesive sheet comprising a surface stock and an adhesive layer, the adhesive layer being formed by coating the surface stock with an adhesive containing a copolymer in the form of an aqueous emulsion and drying the adhesive, the adhesive having redispersibility in water or an alkali aqueous solution, the copolymer comprising, based on the copolymer;

(a) 5 to 40% by weight of at least one member selected from the group consisting of a compound represented by the formula (1)

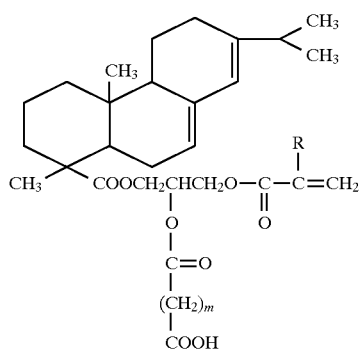

wherein R is methyl group or a hydrogen atom and m is an integer of 1 to 8
and a compound represented by the formula (2)

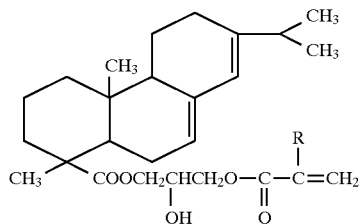

wherein R is methyl group or a hydrogen atom, (b) 5 to 40% by weight of a (poly)ethylene glycol (meth) acrylate monomer, and (c) 30 to 60% by weight of a (meth)acrylic acid C 4–18 alkyl ester monomer.

2. The adhesive sheet according to claim 1, wherein the copolymer further contains (d) an ethylenically unsaturated carboxylic acid-containing monomer in an amount of 20% by weight or less.

3. The adhesive sheet according to claim 2, wherein the copolymer further contains another monomer as component (e) which is copolymerizable with components (a), (b), (c) and (d).

4. The adhesive sheet according to claim 1, wherein the component (a) of the copolymer is the compound represented by the formula (1).

5. The adhesive sheet according to claim 1, wherein the copolymer further contains (d) an ethylenically unsaturated carboxylic acid-containing monomer in an amount of 0.5 to 20% by weight based on the copolymer, and wherein the adhesive contains a crosslinking agent in an amount of 0.1 to 10 parts by weight per 100 parts by weight of the copolymer, the adhesive sheet having removability.

6. The adhesive sheet according to claim 5, wherein the crosslinking agent is a compound having at least two epoxy or isocyanate groups per molecule.

7. The adhesive sheet according to claim 5, wherein the copolymer further contains another monomer as component (e) which is copolymerizable with components (a), (b), (c) and (d).

8. The adhesive sheet according to claim 1, wherein the surface stock is calcium-free base paper or calcium-free coated paper.

9. The adhesive sheet according to claim 1, wherein the surface stock is a film composed of a water-soluble high-molecular-weight substance or a lactic acid-based polymer as a main component, the film being dispersible or soluble in water or an alkali aqueous solution.

10. The adhesive sheet according to claim 1, wherein the adhesive layer is protected with a release liner which is disintegrated in water or an alkali aqueous solution.

11. The adhesive sheet according to claim 10, wherein the release liner comprises (i) a support of paper selected from clay-coated paper, kraft paper and woodfree paper, (ii) a sealing layer formed on said support and composed of a pigment and a water-soluble high-molecular-weight substance and/or an acrylic resin, the acrylic resin having a glass transition temperature of 5° C. or less, and (iii) a release agent layer formed on the sealing layer.

12. The adhesive sheet according to claim 10, wherein the release liner comprises a support composed of a water-soluble high-molecular-weight substance or a lactic acid-based polymer as a main component, and a release agent layer formed on the support.

13. The adhesive sheet according to claim 10, wherein the release liner comprises a support having a lactic acid-based polymer laminated thereon or impregnated therein, and a release agent layer formed on the support.

14. The adhesive sheet according to claim 1, wherein the copolymer further contains another monomer as component (e) which is copolymerizable with components (a), (b) and (c).

15. An adhesive sheet comprising a surface stock, an adhesive layer and a release liner, the adhesive layer being formed (i) by coating the surface stock with an adhesive containing a copolymer in the form of an aqueous emulsion and drying the adhesive or (ii) by applying an adhesive containing a copolymer in the form of an aqueous emulsion to the surface of a release agent layer of the release liner, drying the applied adhesive to form an adhesive layer, and affixing the surface stock to the adhesive layer, the adhesive having redispersibility in water or an alkali aqueous solution, the copolymer comprising, based on the copolymer,
- (a) 5 to 40% by weight of at least one member selected from the group consisting of a compound represented by the formula (1)

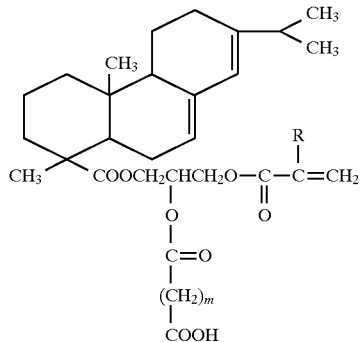

wherein R is methyl group or a hydrogen atom and m is an integer of 1 to 8
and a compound represented by the formula (2)

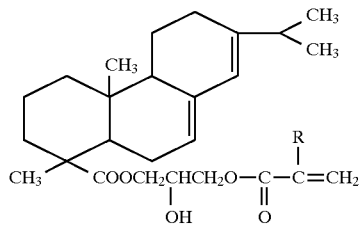

wherein R is methyl group or a hydrogen atom,
- (b) 5 to 40% by weight of a (poly)ethylene glycol (meth)acrylate monomer, and
- (c) 30 to 60% by weight of a (meth)acrylic acid $C_{4-18}$ alkyl ester monomer.

16. The adhesive sheet according to claim 15, wherein the copolymer further contains (d) an ethylenically unsaturated carboxylic acid-containing monomer in an amount of 20% by weight or less.

17. The adhesive sheet according to claim 15, wherein the component (a) of the copolymer is the compound represented by the formula (1).

18. The adhesive sheet according to claim 15, wherein the surface stock is calcium-free base paper or calcium-free coated paper.

19. The adhesive sheet according to claim 15, wherein the adhesive layer is protected with the release liner which is disintegrated in water or an alkali aqueous solution.

20. The adhesive sheet according to claim 19, wherein the release liner comprises (i) a support of paper selected from clay-coated paper, kraft paper and woodfree paper, (ii) a sealing layer formed on said support and composed of a pigment and a water-soluble high-molecular-weight substance and/or an acrylic resin, the acrylic resin having a glass transition temperature of 5° C. or less, and (iii) a release agent layer formed on the sealing layer.

21. The adhesive sheet according to claim 19, wherein the release liner comprises a support composed of a water-soluble high-molecular-weight substance or a lactic acid-based polymer as a main component, and a release agent layer formed on the support.

22. The adhesive sheet according to claim 19, wherein the release liner comprises a support having a lactic acid-based polymer laminated thereon or impregnated therein, and a release agent layer formed on the support.

23. The adhesive sheet according to claim 15, wherein the release liner comprises a support having a polyethylene laminated thereon and a release agent layer formed on the support.

* * * * *